US010859194B2

(12) United States Patent
French

(10) Patent No.: US 10,859,194 B2
(45) Date of Patent: *Dec. 8, 2020

(54) CLEAN AIR DUCT AND RETAINING CLIP AND ASSEMBLY THEREOF

(71) Applicant: STEERE ENTERPRISES, INC., Tallmadge, OH (US)

(72) Inventor: Douglas French, Stow, OH (US)

(73) Assignee: STEERE ENTERPRISES, INC., Tallmadge, OH (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/443,019

(22) Filed: Feb. 27, 2017

(65) Prior Publication Data

US 2017/0167647 A1    Jun. 15, 2017

Related U.S. Application Data

(63) Continuation-in-part of application No. 14/280,784, filed on May 19, 2014, now Pat. No. 9,664,321.

(Continued)

(51) Int. Cl.
*F16L 37/098* (2006.01)

(52) U.S. Cl.
CPC ....... *F16L 37/098* (2013.01); *Y10T 29/49826* (2015.01)

(58) Field of Classification Search
CPC ... F16L 37/0841; F16L 37/088; F16L 37/101; F16L 37/098

(Continued)

(56) References Cited

U.S. PATENT DOCUMENTS

| 3,428,340 A | 2/1969 | Pelton |
| 4,640,534 A | 2/1987 | Hoskins et al. ............. 285/158 |

(Continued)

FOREIGN PATENT DOCUMENTS

| EP | 1 255 069 A1 | 11/2002 | ............ F16L 37/088 |
| EP | 1 635 103 A1 | 3/2006 | ............ F16L 37/088 |

(Continued)

OTHER PUBLICATIONS

Office Action dated Aug. 10, 2016 in related U.S. Appl. No. 14/280,784.

(Continued)

*Primary Examiner* — David Bochna
(74) *Attorney, Agent, or Firm* — Renner Kenner Greive Bobak Taylor & Weber

(57) ABSTRACT

A clean air duct and retaining clip assembly for installation on a receiving port includes a tubular body, and a cuff, which extends from the tubular body, that includes a collar, a retention groove adjacent the collar, and a sealing section adjacent the retention groove. A retaining clip is received around the cuff and has at least one inwardly extending cuff strut received therein to hold the cuff on the receiving port and isolate the sealing section, which is also received on the receiving port, from forces applied to the tubular body. The retaining clip includes an arcuate clip body with an external surface opposite an internal surface connected by opposed edges. At least one pair of struts extends inwardly from the internal surface, where one of the struts is proximal one of the edges and the other is proximal the opposite edge.

26 Claims, 32 Drawing Sheets

Related U.S. Application Data

(60) Provisional application No. 61/825,151, filed on May 20, 2013.

(58) Field of Classification Search
USPC .................................................. 285/305, 903
See application file for complete search history.

(56) References Cited

U.S. PATENT DOCUMENTS

| | | | |
|---|---|---|---|
| 4,991,880 A | 2/1991 | Bemart | 285/321 |
| 5,529,743 A | 6/1996 | Powell | 264/513 |
| 5,682,924 A | 11/1997 | Powell | 138/109 |
| 5,855,399 A | 1/1999 | Profunser | 285/305 |
| 6,041,824 A | 3/2000 | Powell | 138/109 |
| 6,102,450 A | 8/2000 | Harcourt | 285/401 |
| 6,110,412 A | 8/2000 | Anderson | 264/504 |
| 6,409,228 B1 | 6/2002 | Fadini et al. | 285/305 |
| 6,443,500 B1 | 9/2002 | Inoue et al. | 285/307 |
| 6,464,263 B1 | 10/2002 | Schwarz et al. | 285/305 |
| 6,494,502 B1 | 12/2002 | Plante | 285/373 |
| 6,508,491 B1 | 1/2003 | Ebinger et al. | 285/223 |
| 6,681,458 B2 | 1/2004 | Seymour | 24/675 |
| 6,808,211 B2 | 10/2004 | Hofmann et al. | 285/305 |
| 6,846,023 B2 | 1/2005 | Ebinger et al. | 285/420 |
| 6,991,270 B2 | 1/2006 | Ito et al. | 285/403 |
| 6,997,486 B2 | 2/2006 | Milhas | 285/305 |
| 7,128,347 B2 | 10/2006 | Kerin | 285/305 |
| 7,201,403 B2 | 4/2007 | Takayanagi et al. | 285/321 |
| 7,325,841 B2 | 2/2008 | Vincent | 285/305 |
| 7,338,093 B2 | 3/2008 | Bilstein et al. | 285/307 |
| 7,469,937 B2 | 12/2008 | Iturgoyen Sabando et al. | 285/305 |
| 7,497,478 B2 | 3/2009 | Callahan | 285/305 |
| 7,530,605 B2 | 5/2009 | Rigollet et al. | 285/305 |
| 7,562,910 B2 | 7/2009 | Kertesz et al. | 285/256 |
| 7,566,079 B1 | 7/2009 | Callahan et al. | 285/362 |
| 7,611,317 B2 | 11/2009 | Muderlak et al. | 411/522 |
| 7,618,070 B2 | 11/2009 | Stoll et al. | 285/305 |
| 7,651,138 B2 | 1/2010 | Feger et al. | 285/319 |
| 7,694,694 B2 | 4/2010 | Welle | 285/314 |
| 7,695,024 B2 | 4/2010 | Ostergren et al. | 285/308 |
| 7,828,338 B2 | 11/2010 | Kertesz et al. | 285/365 |
| 7,874,596 B2 | 1/2011 | Kertesz et al. | 285/417 |
| 7,971,911 B2 | 7/2011 | Kertesz et al. | 285/305 |
| 8,419,076 B2 | 4/2013 | Keller et al. | 285/314 |
| 8,857,398 B2 | 10/2014 | Schieszl | 123/184.21 |
| 9,004,543 B2 | 4/2015 | Bongiorni et al. | F16L 21/08 |
| 9,103,479 B2 | 8/2015 | Kertesz et al. | F16L 33/28 |
| 9,175,794 B2 | 11/2015 | Lewcun | F16L 37/113 |
| 9,283,344 B2 | 3/2016 | Sheffer et al. | A61M 16/0816 |
| 9,383,050 B1 | 7/2016 | Home | F16L 21/08 |
| 9,429,261 B2 | 8/2016 | Hess et al. | F16L 37/12 |
| 2001/0002754 A1 | 7/2001 | Dobler et al. | 285/321 |
| 2004/0183301 A1 | 9/2004 | Yoshida | 285/305 |
| 2006/0022460 A1 | 2/2006 | Callahan | 285/305 |
| 2009/0102181 A1 | 4/2009 | Hartmann | 285/26 |
| 2009/0218807 A1 | 9/2009 | Seryi | 285/24 |
| 2010/0225108 A1 | 9/2010 | Mann | 285/321 |
| 2010/0301596 A1* | 12/2010 | Amann | F16L 37/0985 285/31 |
| 2011/0025042 A1 | 2/2011 | McNeil | 285/39 |
| 2013/0140808 A1 | 6/2013 | Bongiorni et al. | F16L 21/08 |
| 2014/0070531 A1 | 3/2014 | Inoue et al. | F16L 21/08 |
| 2014/0167410 A1 | 6/2014 | Hess et al. | F16L 37/08 |
| 2014/0210202 A1 | 7/2014 | Hess et al. | F16L 21/08 |
| 2014/0326223 A1 | 11/2014 | Proettel et al. | F02M 35/10209 |
| 2015/0076812 A1 | 3/2015 | Hess | F16L 37/088 |
| 2015/0226162 A1 | 5/2015 | Kohler | F16L 21/08 |
| 2015/0176740 A1 | 6/2015 | Ludwig | F16L 37/0982 |
| 2015/0276108 A1 | 10/2015 | Ye et al. | F16L 37/088 |
| 2015/0345684 A1 | 12/2015 | Kujawski, Jr. | F16L 37/138 |

FOREIGN PATENT DOCUMENTS

| | | | |
|---|---|---|---|
| EP | 1 705 417 A2 | 9/2006 | F16L 37/14 |
| FR | 2 883 952 A1 | 10/2006 | F16L 37/086 |
| FR | 2 854 675 | 12/2006 | F16L 19/00 |
| GB | 2 392 481 | 10/2005 | F16L 37/138 |
| WO | WO 2005/047752 A1 | 3/2005 | F16L 37/088 |
| WO | WO 2007/036794 A1 | 4/2007 | F16L 37/14 |
| WO | WO 2015/141557 A1 | 9/2015 | F16L 37/14 |
| WO | WO 2016/169706 A1 | 10/2016 | F16L 37/12 |
| WO | WO 2016/169706 A1 | 12/2016 | F16L 37/12 |

OTHER PUBLICATIONS

Response to OA dated Aug. 10, 2016 as filed Oct. 11, 2016 in related U.S. Appl. No. 14/280,784.

Office Action dated Feb. 14, 2017 in related U.S. Appl. No. 14,280,784.

Response to OA dated Feb. 14, 2017 as filed Apr. 12, 2017 in related U.S. Appl. No. 4/280,784.

\* cited by examiner

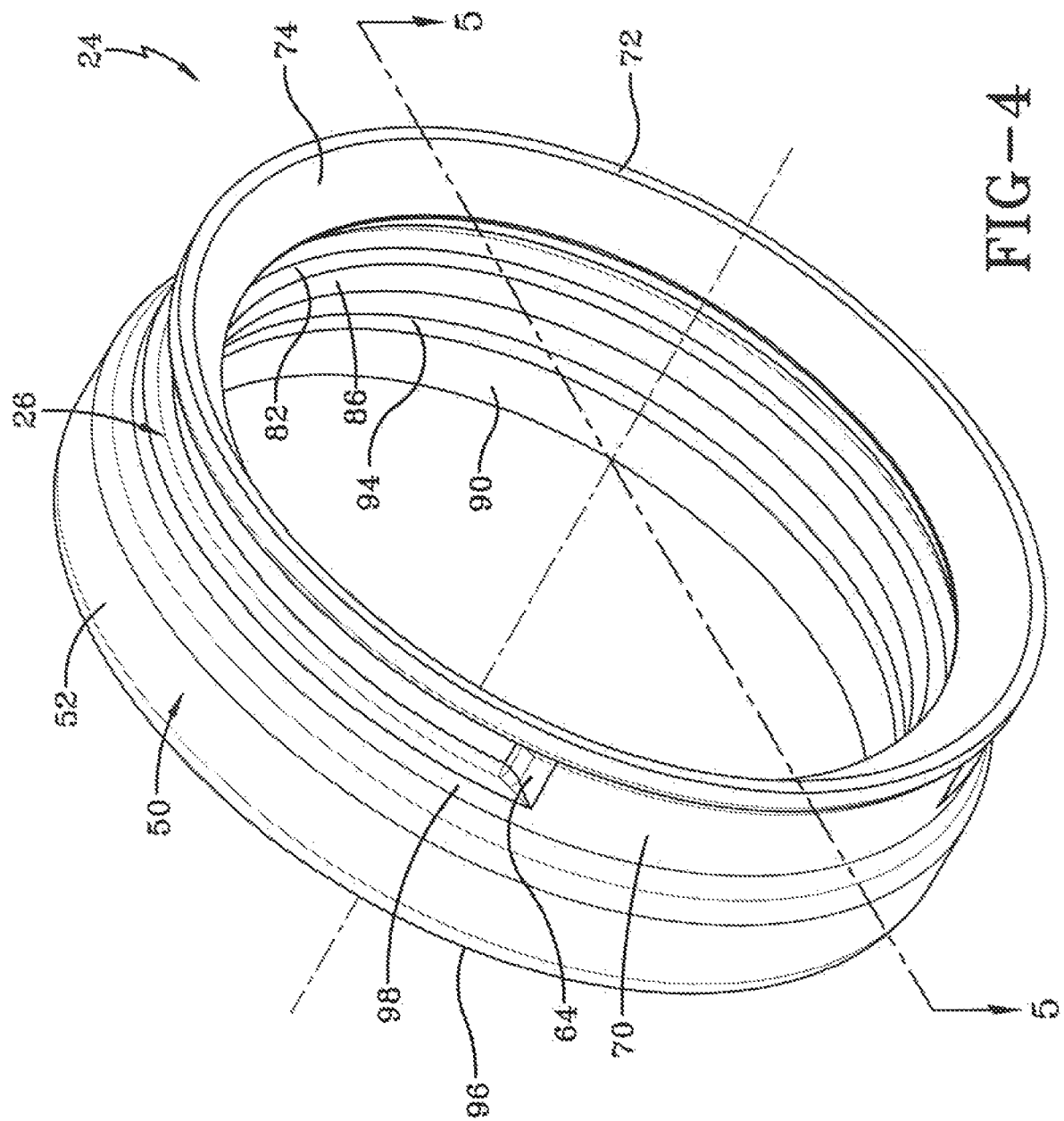

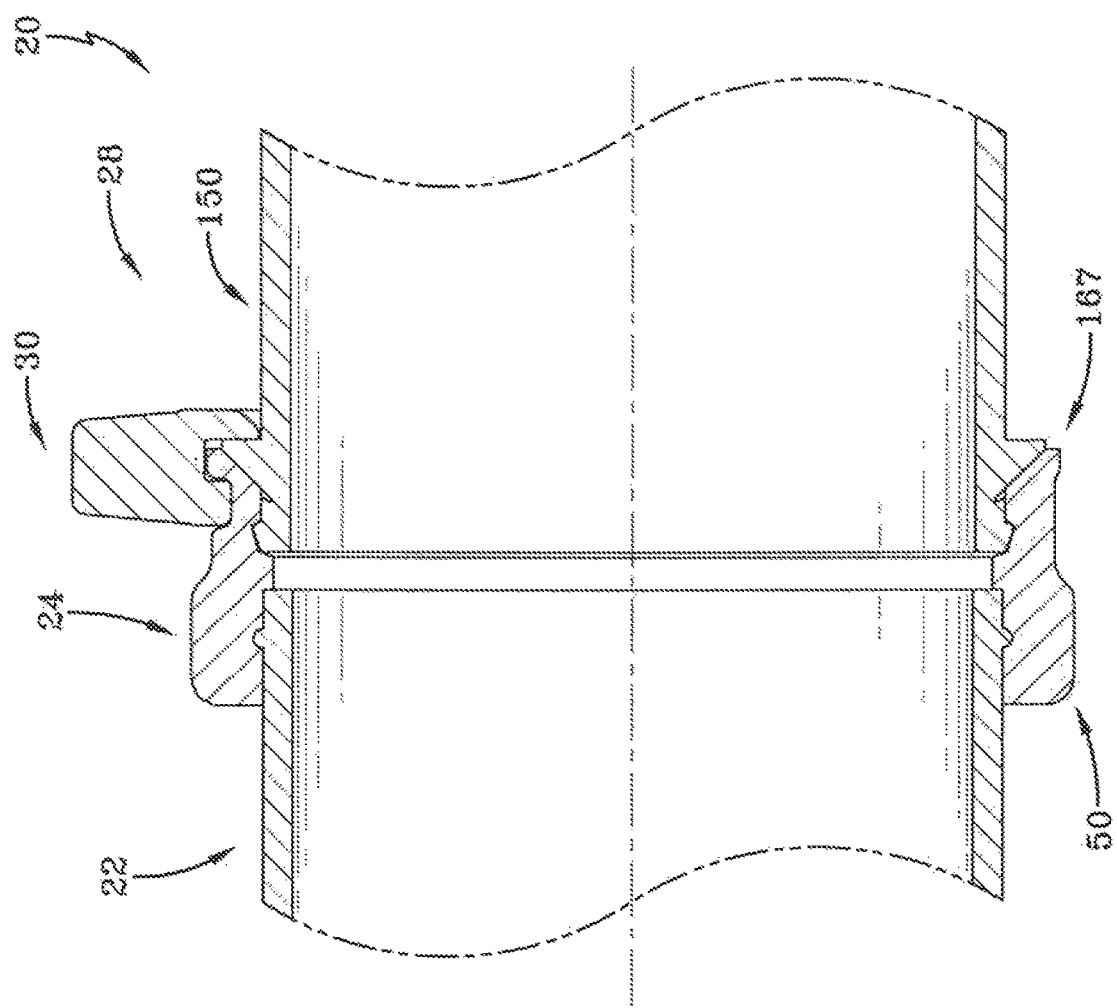

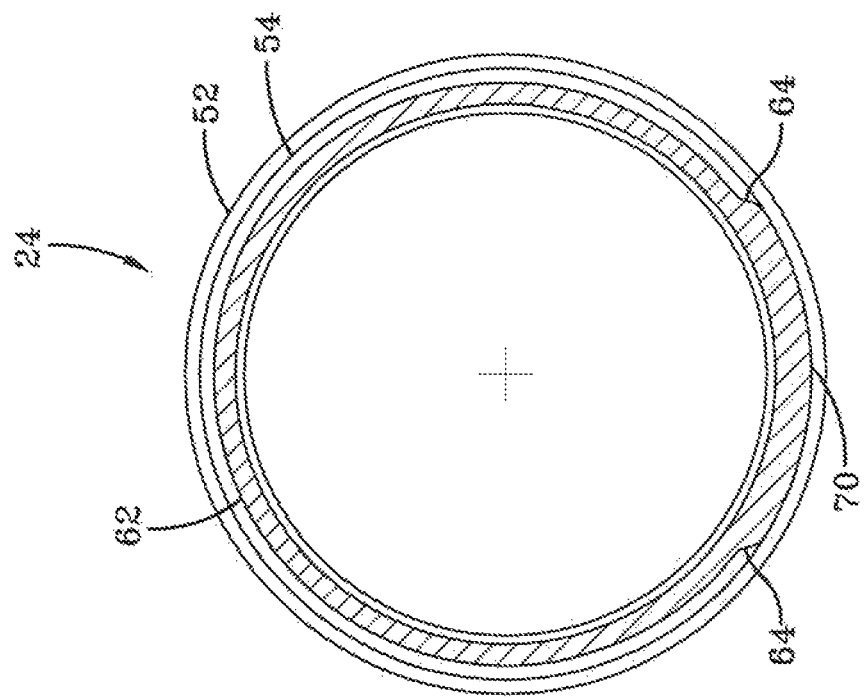
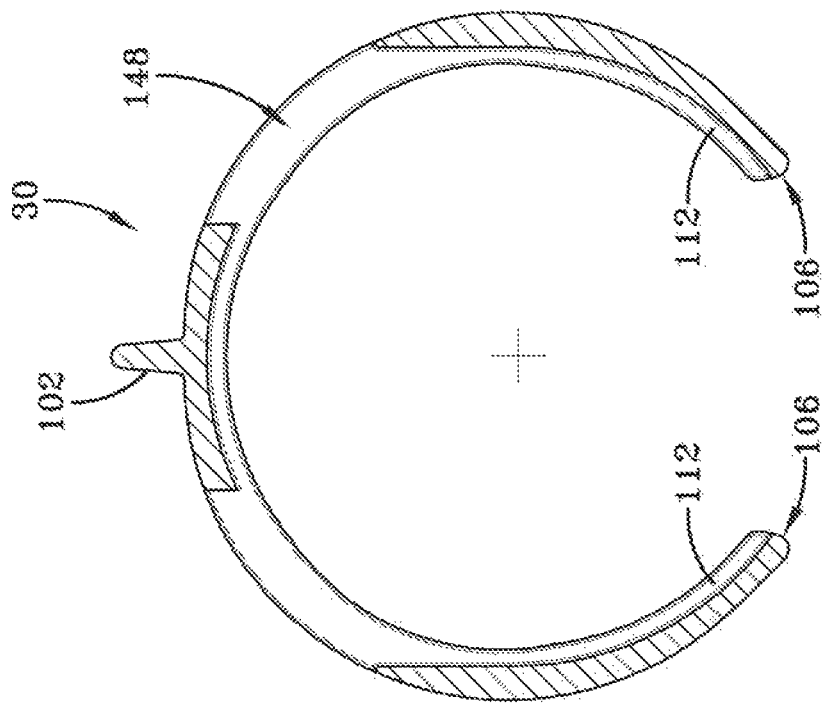

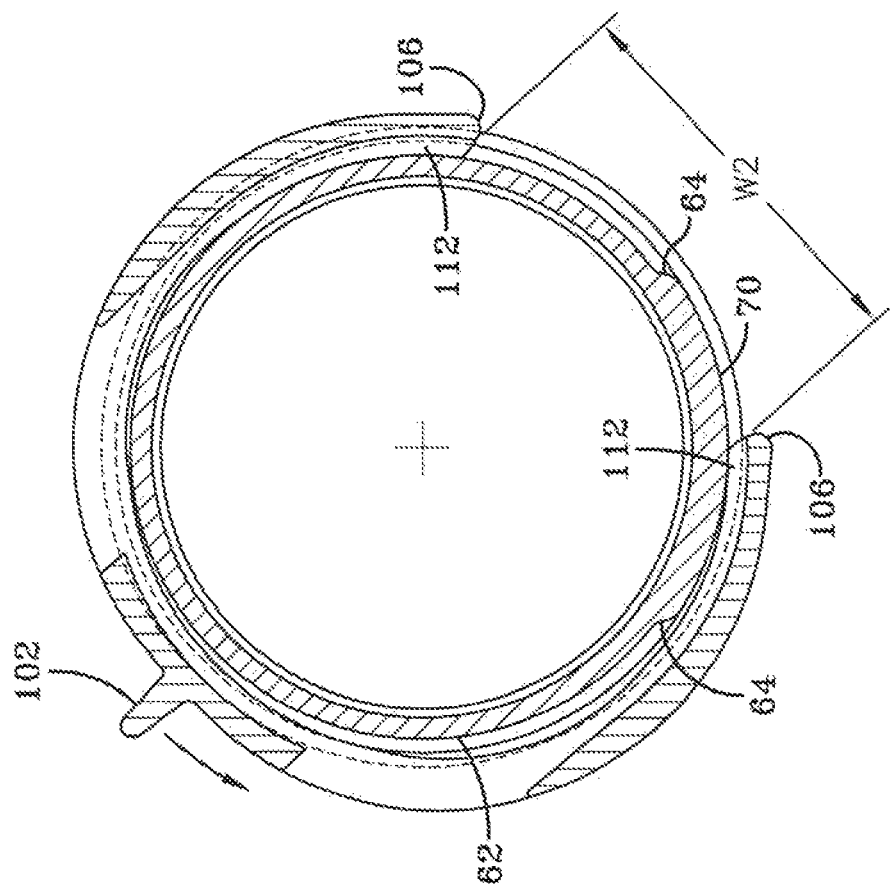
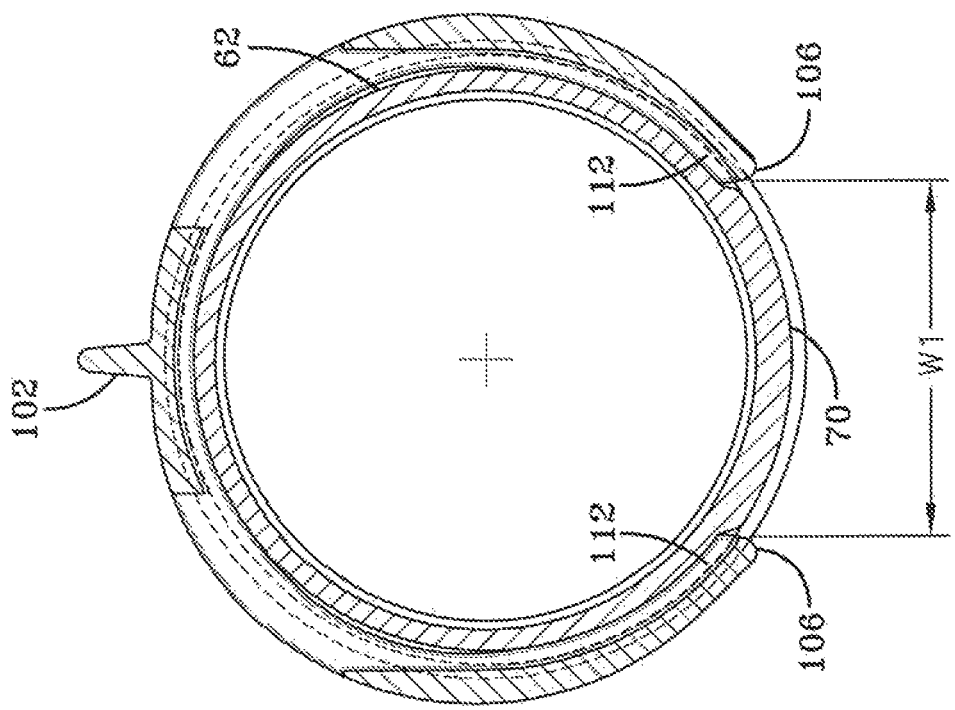
FIG-19D
FIG-19C

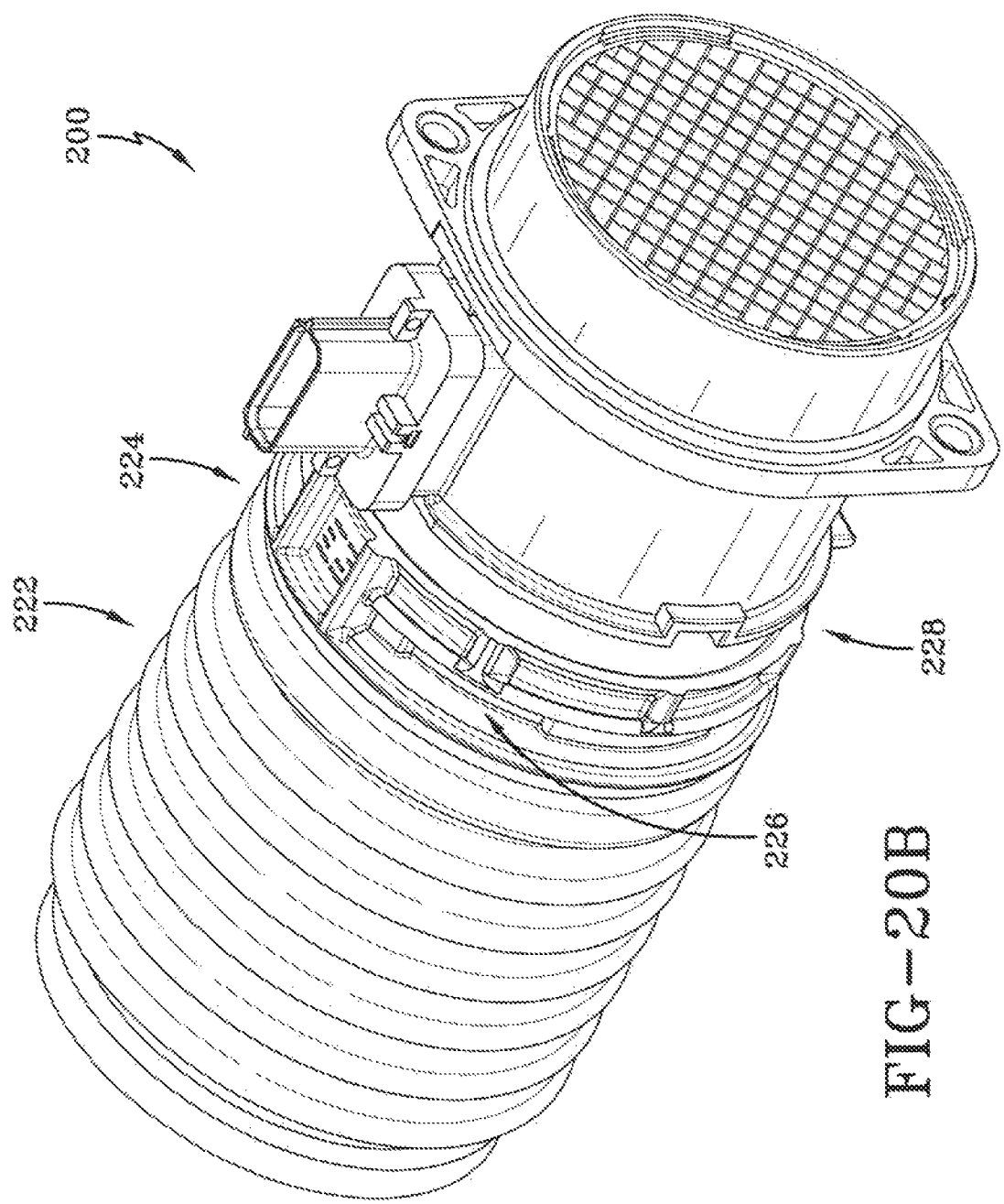

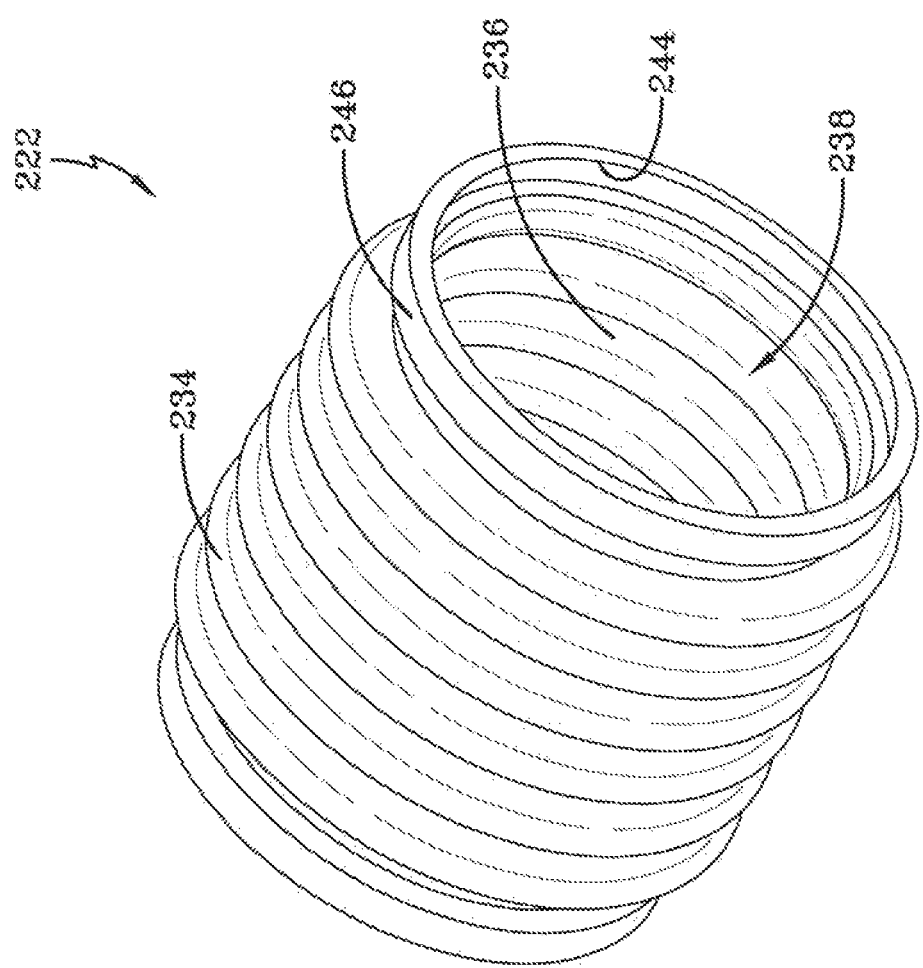

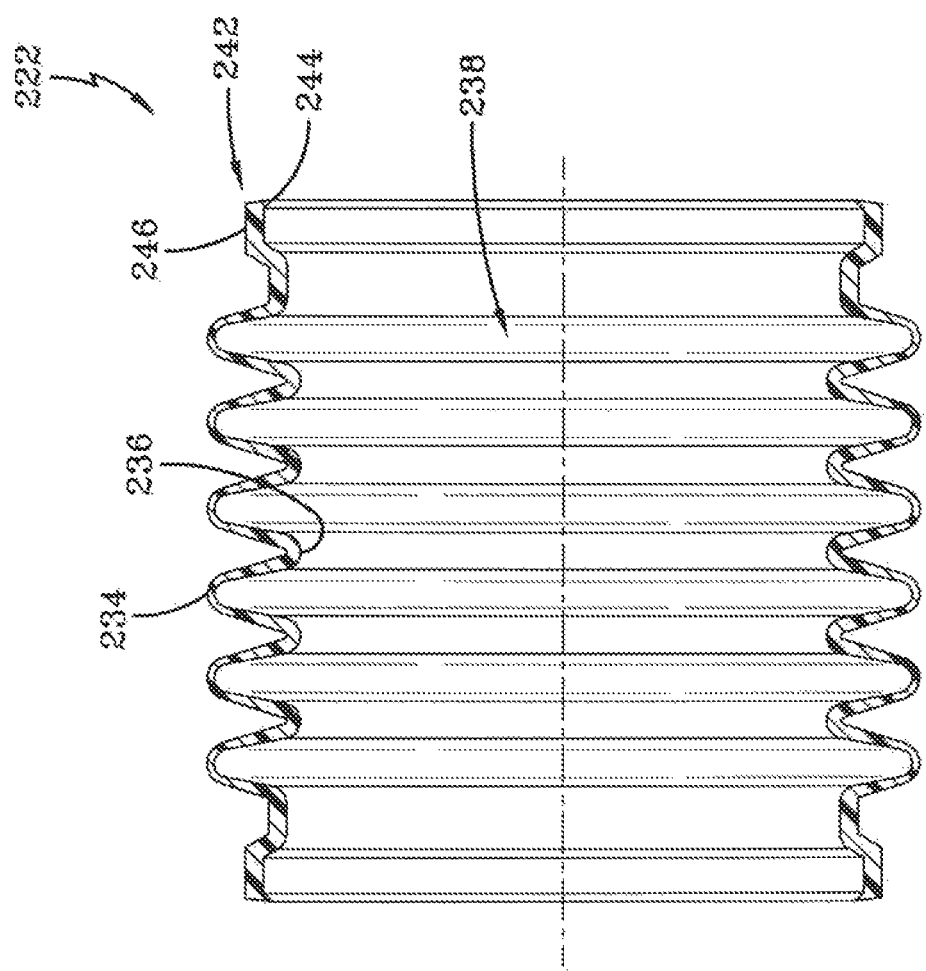

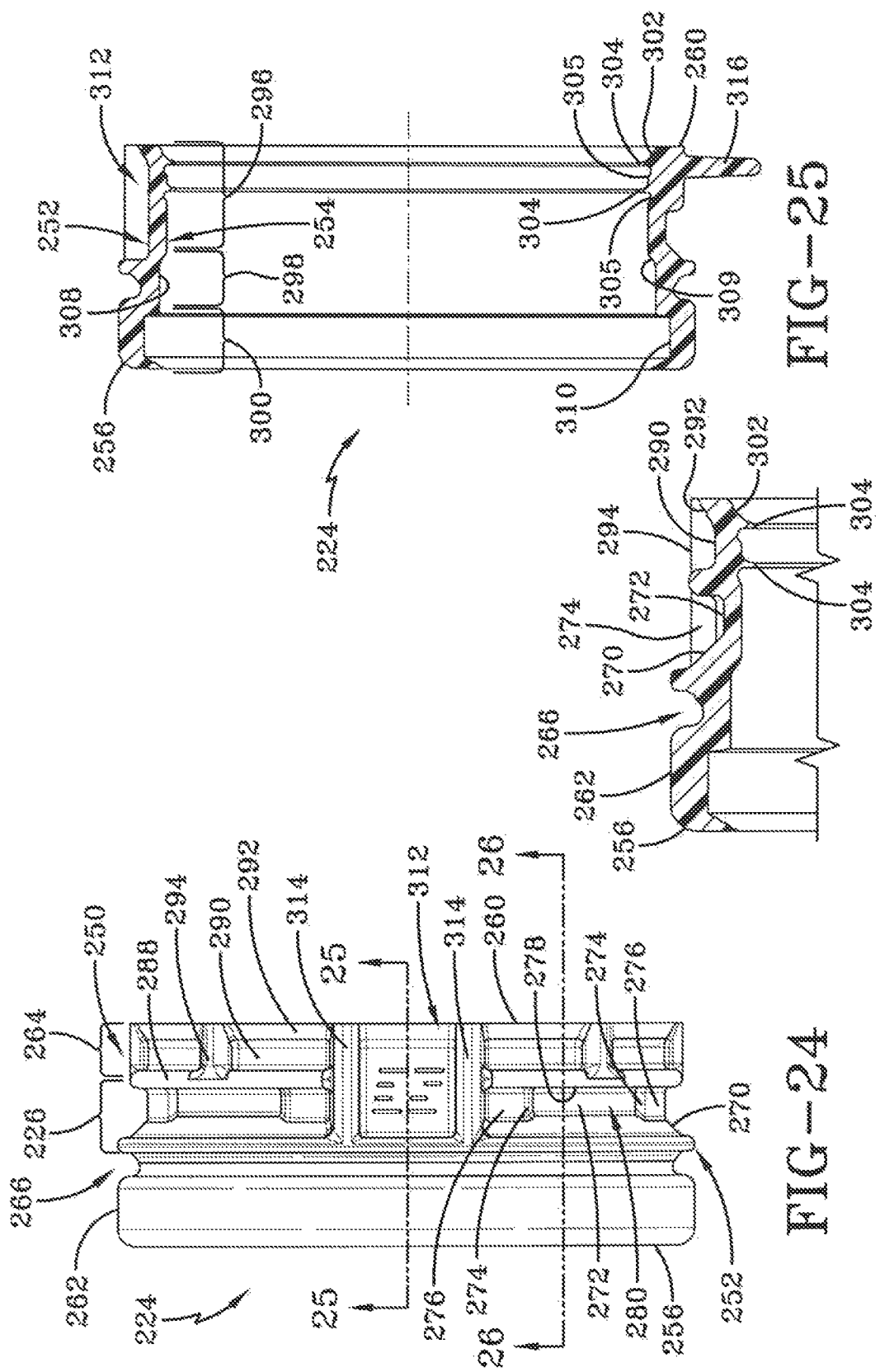

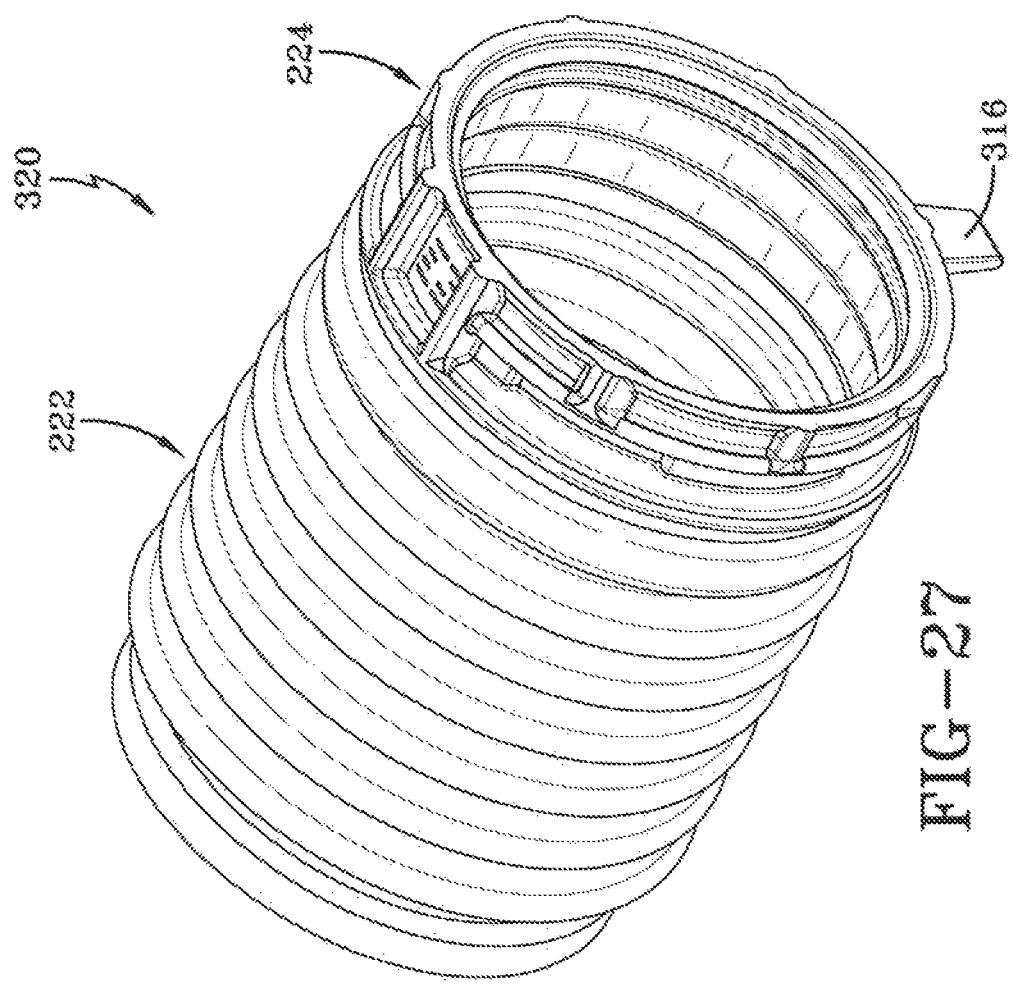

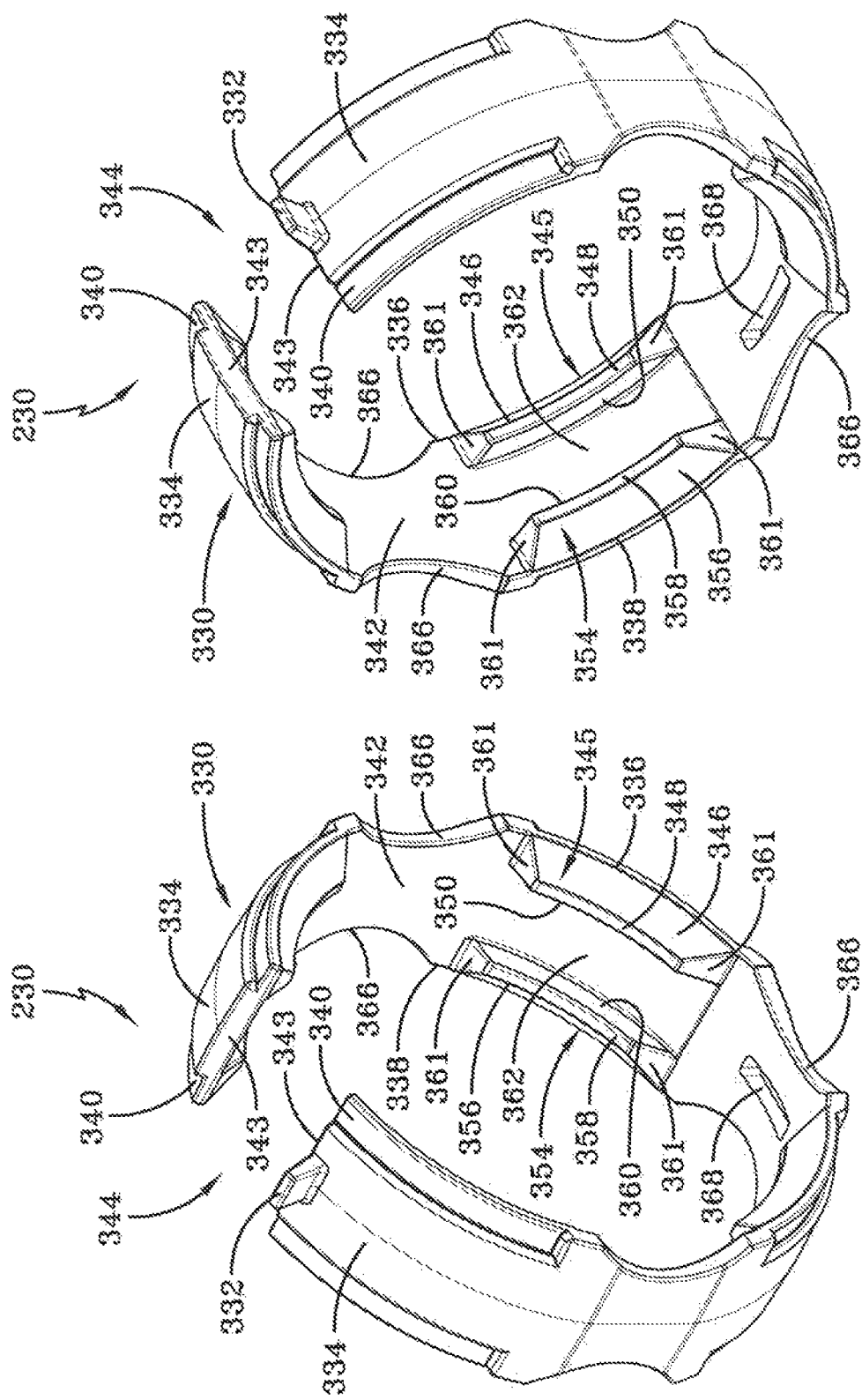

CLEAN AIR DUCT AND RETAINING CLIP AND ASSEMBLY THEREOF

CROSS-REFERENCE TO RELATED APPLICATIONS

This application claims priority of U.S. application Ser. No. 14/280,784 filed May 19, 2014, now U.S. Pat. No. 9,664,321, and U.S. Provisional Application Ser. No. 61/825,151 filed May 20, 2013, both of which are incorporated herein by reference.

TECHNICAL FIELD

The present invention relates in general to an automotive clean air duct used to interconnect an automobile engine throttle body to an air filter. More particularly, the present invention relates to a clean air duct with a cuff that is positioned on a receiving port, wherein the cuff is attached to the receiving port with a deflectable clip. Specifically, the cuff includes at least one flexible fin that seals around the port when the deflectable clip and cuff are installed on the receiving port such that the clip provides a stress relief so as to isolate the flexible fins from the clean air duct.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile. Air ducts are widely used in other applications wherever air or any other gas-like substance is transferred between components.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles which have limited space in the engine compartment.

An alternative to using a one-piece rubber molded air duct is a two-piece construction which utilizes a thermoplastic blow molded tubular body with an injection molded rubber cuff, sometimes called a seal, affixed to an end thereof. Although such a construction works better than the rubber molded ducts, both constructions rely on a hose clamp to circumferentially secure the cuff to a receiving port. Hose clamps are usually constructed from a metal band with a tightening screw wherein the screw is tightened so as to completely secure the duct to the receiving port. Specifically, the clamp is placed around the area where the cuff and receiving duct overlap. The clamp is then tightened to prevent air leakage or entry of dirt into the duct and also prevents the two components from separating during operation of the vehicle. Skilled artisans will appreciate that such a configuration has several drawbacks. First, it is time consuming to assemble the hose clamp, as it requires use of at least a screwdriver or other appropriate tool. Additionally, over-tightening of the clamp and engine vibration may cause the metal band to cut into the cuff which results in cuff tears and eventual leakage or openings in the cuff. Additionally, the metal may corrode over time and ultimately fail, thus rendering the sealed connection broken. Still a further drawback is that the seal formed between the cuff and the receiving port is not adequately isolated from vibration and flexure forces applied to the air duct. As a result, over time, the effectiveness of the seal provided by the cuff is minimized. Accordingly, there is a need in the art for a clean air duct with a cuff that utilizes a clip that replaces the hose clamp and which provides a more reliable seal by isolating the seal between the cuff and the receiving port from flexure and vibration forces applied to the air duct and cuff assembly and wherein the air duct and cuff are installed without any tools so as to result in a cost savings in the overall assembly and the assembly process.

Disclosure of the Invention

It is therefore an object of the present invention to provide a clean air duct and retaining clip and assembly thereof.

It is another object of the present invention to provide a clean air duct and retaining clip assembly for installation on a receiving port, comprising a tubular body, a cuff extending from the tubular body, the cuff having a collar connected to the tubular body, a retention groove adjacent the collar and a sealing section adjacent the retention groove, and a retaining clip received around the cuff, the retaining clip having at least one inwardly extending cuff strut received in the retention groove so as to hold the cuff on the receiving port and isolate the sealing section, which is also received on the receiving port, from forces applied to the tubular body.

Yet another aspect of the present invention is to provide a retaining clip used to connect a clean air duct to a receiving port, comprising an arcuate clip body having an external surface opposite an internal surface connected by opposed edges, at least one pair of struts extending inwardly from the internal surface, wherein one of the struts is proximal one of the edges and the other of the struts is proximal the opposite edge.

BRIEF DESCRIPTION OF THE DRAWINGS

These and other features and advantages of the present invention will become better understood with regard to the following description, appended claims, and accompanying drawings. Further, in the accompanying drawings and description that follow, like parts are indicated throughout the drawings and written description with the same reference numerals, respectively. The figures may or may not be drawn to scale and proportions of certain parts may be exaggerated for convenience of illustration.

FIG. 4 is a perspective view of a cuff utilized in the assembly according to the concepts of the present invention;

FIG. 18 is a cross-sectional view of the sub-assembly, the receiving port and the retaining clip according to the concepts of the present invention;

FIG. 19A is a cross-sectional view of the clip according to the concepts of the present invention;

FIG. 19B is a cross-sectional view of the according to the concepts of the present invention;

FIG. 19C is a cross-sectional view of the clip installed on the cuff in an installed condition;

FIG. 19D is a cross-sectional view of the clip rotated with respect to the cuff so as to allow for removal of the clip according to the concepts of the present invention;

FIG. 20B is an assembled perspective view of the alternative clean air duct and retaining clip assembly partially assembled and without a retaining clip made in accordance with the concepts of the present invention;

FIG. 21 is a perspective view of a tubular body utilized in the alternative assembly according to the concepts of the present invention;

FIG. 22 is a cross-sectional view of the tubular body used in the alternative assembly;

FIG. 24 is an elevational view of the cuff according to the concepts of the present invention;

FIG. 25 is a cross-sectional view of the cuff according to the concepts of the present invention taken along lines 25-25 of FIG. 24;

FIG. 26 is an enlarged cross-sectional view of a portion of the cuff utilized in the alternative assembly according to the concepts of the present invention;

FIG. 27 is a perspective view of a cuff and tubular body sub-assembly of the alternative assembly according to the concepts of the present invention;

FIG. 29 is a right side perspective view of a retaining clip utilized in the alternative assembly according to the concepts of the present invention;

FIG. 30 is a left side perspective view of the retaining clip used in the alternative assembly according to the concepts of the present invention;

BEST MODE FOR CARRYING OUT THE INVENTION

Figure 1:
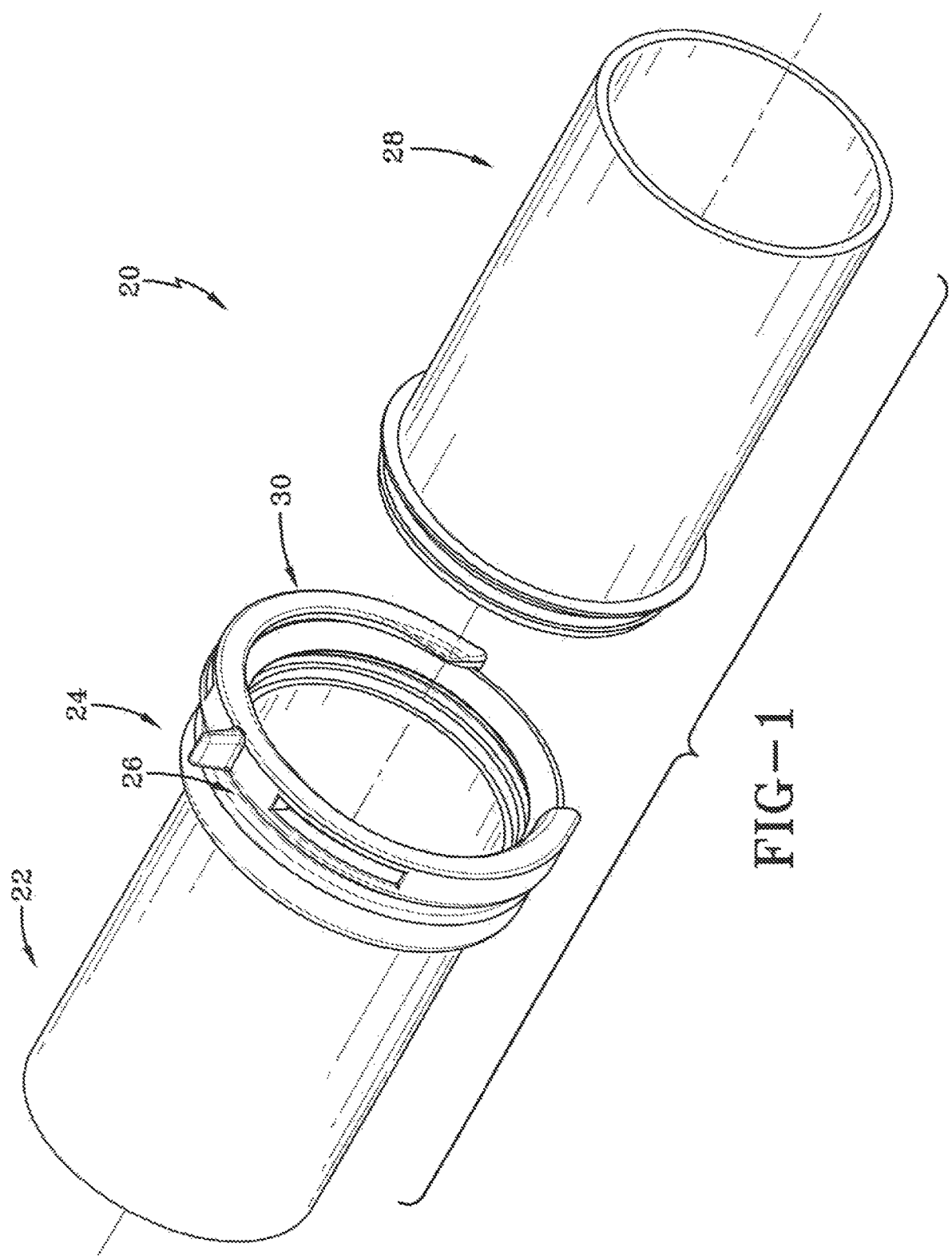
FIG. 1 is a perspective view of a clean air duct and retaining clip assembly made in accordance with the concepts of the present invention.

With reference to the drawings, and in particular to FIG. 1, it can be seen that a clean air duct and retaining clip assembly is designated generally by the numeral 20. The assembly 20 is receivable and/or mounted onto a port such as an air filter, engine compartment, a throttle body, or other similar structure. Although the assembly disclosed herein is used in automobile engine compartments, skilled artisans will appreciate that the duct and associated assembly disclosed herein may be utilized in any environment where air or a gas needs to be transferred from one compartment to another and in such a way so as to seal the duct from external contaminants.

Generally, the assembly 20 comprises a tubular body 22 which has a cuff 24 secured to and around an end of the tubular body 22. The cuff 24 provides an exterior groove 26 about its outer circumference. The tubular body and the cuff, which may be referred to as an air duct or sub-assembly, are assembled onto a receiving port 28. A clip 30, which may be pre-installed on the cuff or installed after the cuff is assembled to the receiving port, secures the air duct to the receiving port so as to provide a secure and air-tight connection therebetween.

Figure 2:
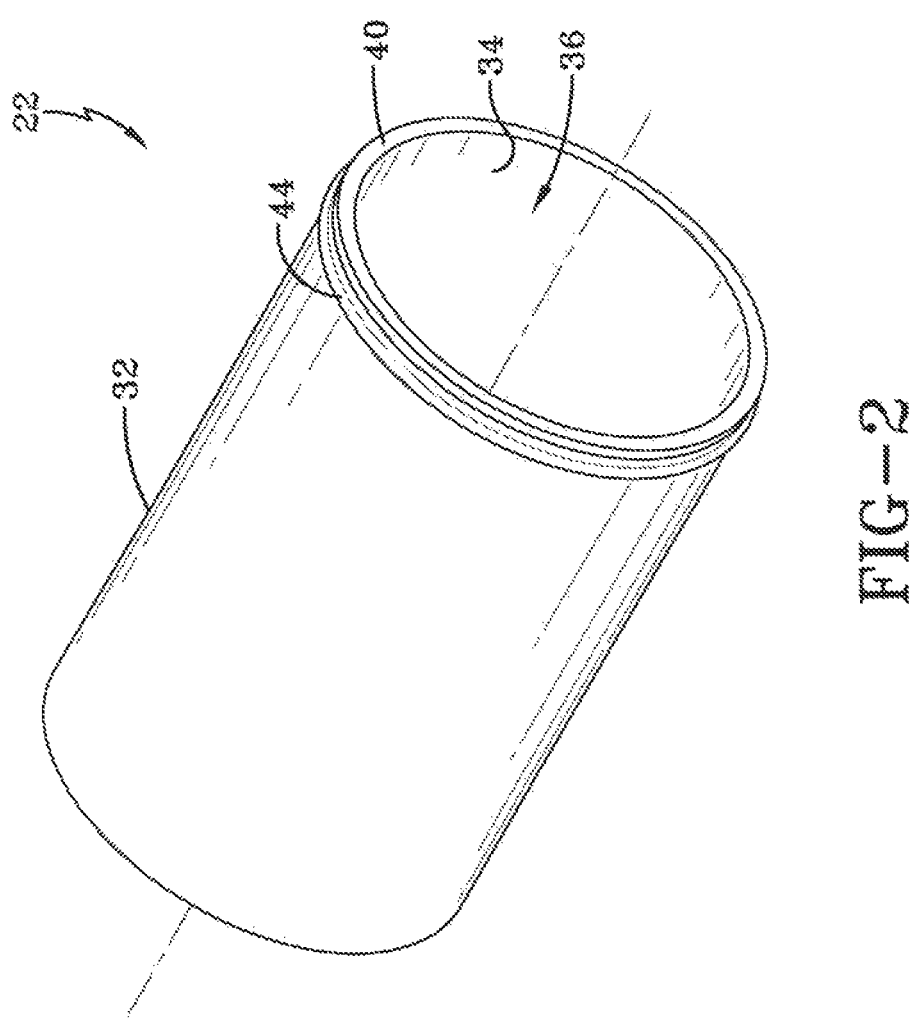
FIG. 2 is a perspective view of a tubular body utilized in the assembly according to the concepts of the present invention.
Figure 3:
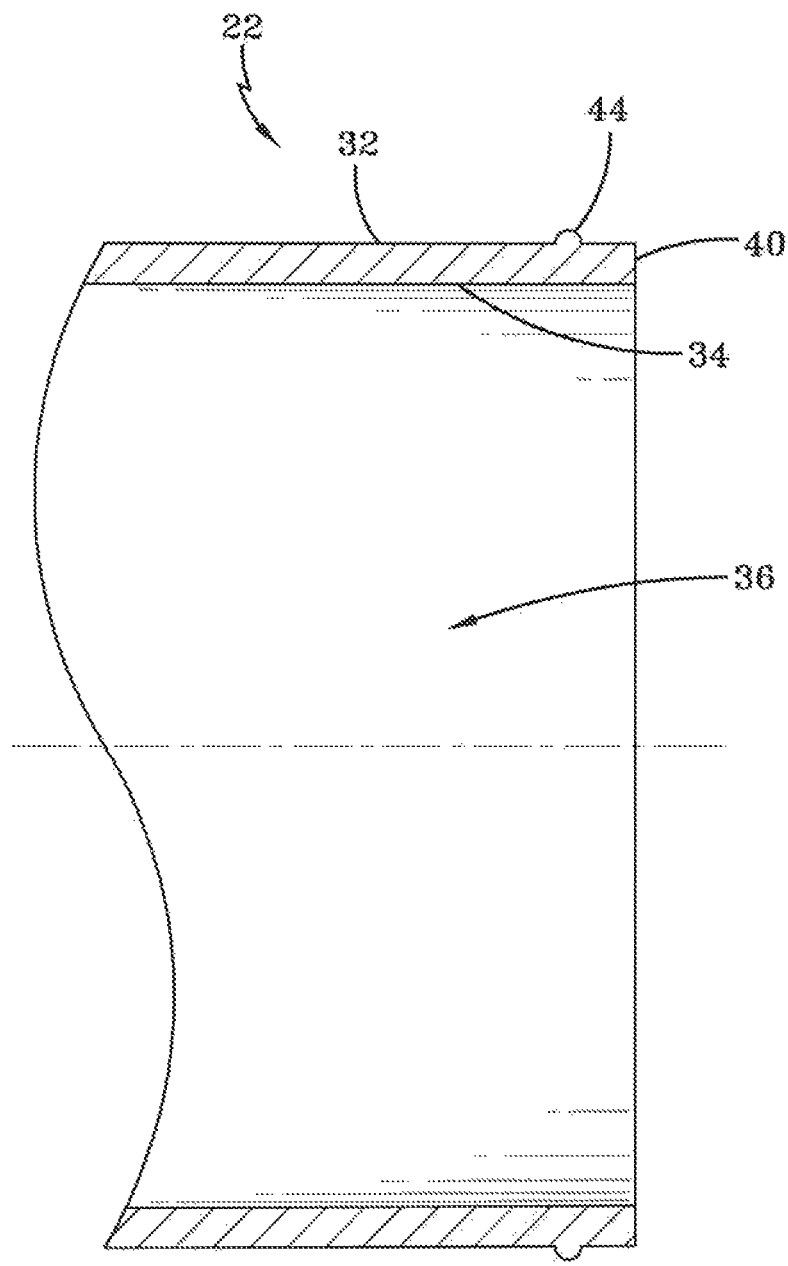
FIG. 3 is a cross-sectional view of the tubular body.

Referring now to FIGS. 2 and 3, it can be seen that the tubular body 22 includes an exterior surface 32 opposite an interior surface 34. The interior surface forms a body interior 36 which provides the opening or void to allow for transfer of air or other gaseous materials between the ends of the tubular body. A cuff end 40 interconnects the exterior surface 32 and the interior surface 34. In one embodiment, an annular ring 44, which may be slightly removed or positioned away from the cuff end 40, is disposed around the exterior surface 34. The annular ring 44 may be rounded or of a square configuration. In an alternative embodiment, the tubular body 22 may be provided with an inwardly extending lip as disclosed and shown in U.S. Pat. No. 5,682,924, which is incorporated herein by reference.

The tubular body 22, in most embodiments, is manufactured utilizing a blow-molding process. In some embodiments, the body may be configured by extrusion or injection molding. The tubular body may be made from a polymeric material such as polypropylene manufactured by Lyondell Bassel under port number Pro-Fax™ SV152 which has a hardness value of 78 Shore D. Skilled artisans will appreciate that other polymeric materials having similar properties and values may also be utilized. Other suitable materials that could be used for the tubular body 22 are: nylon manufactured by BASF under the part number Ultrmid™ 827G which has a hardness value of 121 Shore R; nylon 6/6 manufactured by DuPont under part number Zytel™ BM70G20HSLX which has a hardness value of 120 Shore R; or thermoplastic elastomer manufactured by Teknor Apex under part number Sarlink™ 4190B which has a hardness value of 90 Shore A. Accordingly, in some embodiments the material used for the tubular body 22 may have a hardness value ranging anywhere from about 70 Shore A to about 130 Shore R, and in other embodiments from about 90 Shore A to about 121 Shore R.

Referring now to FIGS. 4-7, it can be seen that the cuff is designated generally by the numeral 24. Generally, the cuff 24 comprises a cuff body 50 which may be molded to or otherwise secured to the tubular body 22. The cuff body is constructed of a polymeric material and, in particular, a polymeric material which, in most embodiments, is relatively softer than the polymeric material utilized for the tubular body. In most embodiments, the cuff may be made from thermoplastic elastomer which is manufactured by RTP Company under part number RTP™ 6091-65 which has a hardness value of 65 Shore A. Other polymeric materials having similar properties and values may be utilized. Other suitable materials that could be used for the cuff are: thermoplastic elastomers manufactured by Exxon Mobile part number Satoprene™ 101-55, which has a hardness value of 55 Shore A, or Santoprene™ 101-64 which has a hardness value of 64 Shore A. Other suitable thermoplastic elastomers are manufactured by Teknor Apex under part numbers Sarlink 4175B, which has a hardness value of 75 Shore A, or Sarlink 4180B which has a hardness value of 80 Shore A. The RTP Company also manufactures thermoplastic elastomers RTP™ 6091-65, which has a hardness value of 65 Shore A, and RTP 6091-85, which has a hardness value of 85 Shore A. A liquid silicone rubber material manufactured by Wacker Chemical under part number LR 3070/60 which has a hardness value of 60 Shore A may also be utilized. Accordingly, in some embodiments, the material used for the cuff may have a hardness value ranging anywhere from about 45 Shore A to about 90 Shore A, and in other embodiments from about 55 Shore A to about 80 Shore A.

Figure 7:
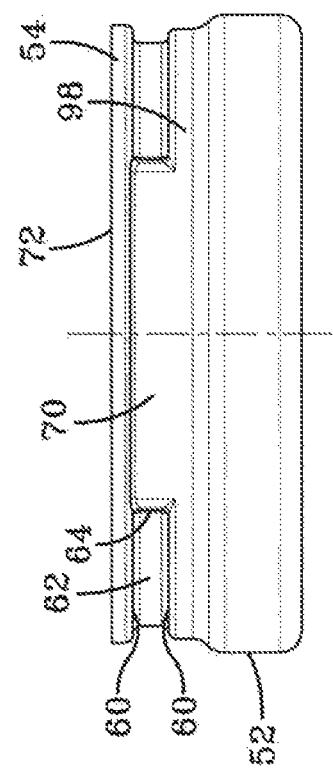
FIG. 7 is a bottom view of the cuff showing a particular feature according to the concepts of the present invention.
Figure 6:
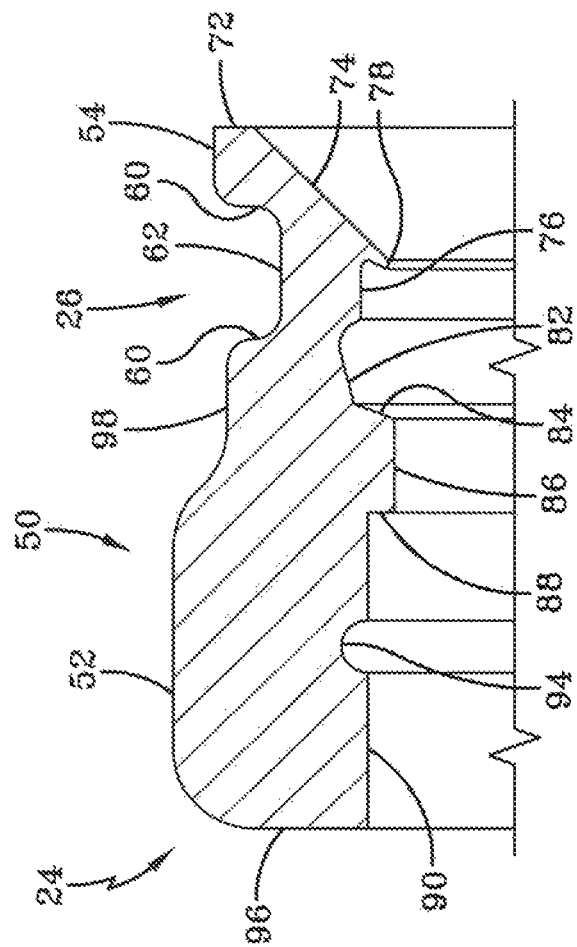
FIG. 6 is an enlarged cross-sectional view of the cuff according to the concepts of the present invention.
Figure 5:
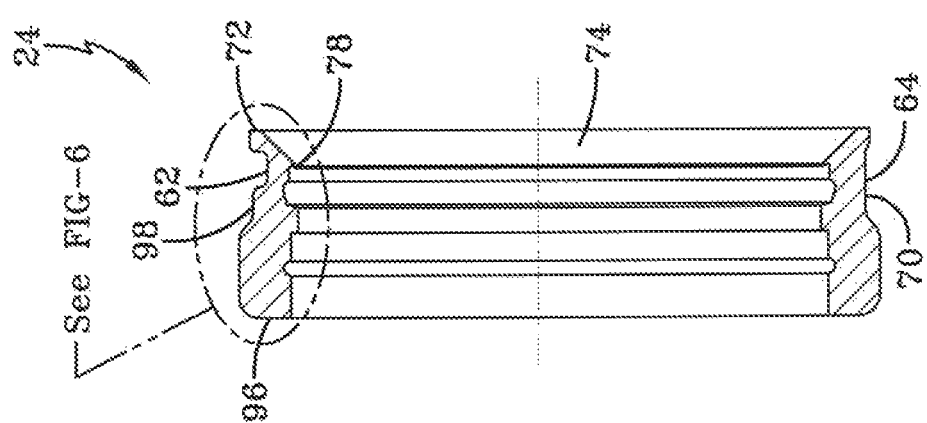
FIG. 5 is a cross-sectional view of the cuff according to the concepts of the present invention.

The cuff body 50 provides a cuff body surface 52 which is the substantive portion of the outer surface of the cuff body 50. At one end of the cuff body surface is a cuff rim 54, wherein the cuff groove 26 is disposed between the cuff rim 54 and the cuff body surface 52. The cuff groove 26 includes a pair of opposed sidewalls 60 which are connected to one another by a cuff surface 62. As will become apparent as the description proceeds, the retaining clip 24 is receiving in the cuff groove 26 and disposed about and on the cuff surface 62 and the cuff rim 54. The cuff groove 26, as best seen in FIG. 7, may be terminated circumferentially at a pair of groove endwalls 64 that are substantially perpendicular with the groove sidewalls 60. It will further be appreciated that in some embodiments the groove endwalls 64 are tapered. In other words, the endwalls 64 angularly extend from the cuff surface 62 to a clip expansion surface 70. The relevance of the groove endwalls 64 and the clip expansion surface 70 will be explained as the description proceeds.

The cuff rim 54 provides a rim end surface 72 which is substantially perpendicular thereto. Further extending from the rim end surface 52 is a chamfer 74 which may be angularly extended from the end surface 72. The chamfer 74 provides a transitional surface so as to assist in positioning the cuff 24 onto the receiving port 28. Angularly extending from the chamfer 74 is a port surface 76 which may be substantially parallel with the cuff surface 62. Moreover, in one embodiment, the port surface 76 may be sized so as to provide a frictional fit about the receiving port 28. Disposed between the chamfer 74 and the port surface 76 may be at least one fin-like wiper 78. The wiper 78, which may angularly project at about the same angle as the chamfer 74, extends radially inward so as to provide a seal about the receiving port 28 when the cuff 24 is installed thereon. In some embodiments, more than one wiper 78 may be provided. It will further be appreciated that the wiper 78 is disposed on the interior side of the cuff opposite the cuff surface 62. As a result, when the retaining clip is installed, an additional compressive force may be applied about the area where the wiper 78 is provided.

Extending from the port surface 76 is a radial channel 82. Further extending from an opposite edge of the radial channel 82 is a ramp surface 84. Extending from an opposite edge of the ramp surface 84 is a gap surface 86 which may be substantially parallel with the cuff body surface 52. Extending substantially perpendicularly from an opposite edge of the gap surface 86 is a body stop surface 88. Extending substantially perpendicularly from the stop surface 88 is a cuff interior surface 90. In some embodiments, a cuff channel 94 which extends radially outward from the interior surface 90 may be provided. Skilled artisans will appreciate that the cuff channel 94, the body stop surface 88, the gap surface 86, the ramp surface 84, the channel 82, the wiper 78, the port surface 76 and the chamfer 74 form the entirety of the interior of the cuff body 50. In other words, these surfaces are inwardly disposed from the cuff and are either secured to the tubular body 22 or are configured to be received on the receiving port 28 as will become apparent.

Extending substantially perpendicularly from the cuff interior surface 90 is a cuff end surface 96 which may transition perpendicularly to the cuff body surface 52. The transition between the cuff end surface 96 may be rounded as shown or may be perpendicular.

Laterally disposed between the outer diameter of the cuff body surface 52 and the cuff groove 26 is a cuff expansion ring 98. In other words, the cuff expansion ring 98 is that surface between the adjacent cuff groove sidewall 60 and the cuff body surface 52. Moreover, the cuff expansion ring 98 may be contiguous with the clip expansion surface 70. In other words, the clip expansion surface 70 and the cuff expansion ring 98 are aligned with one another and are of substantially the same outer diameter.

Figure 8:
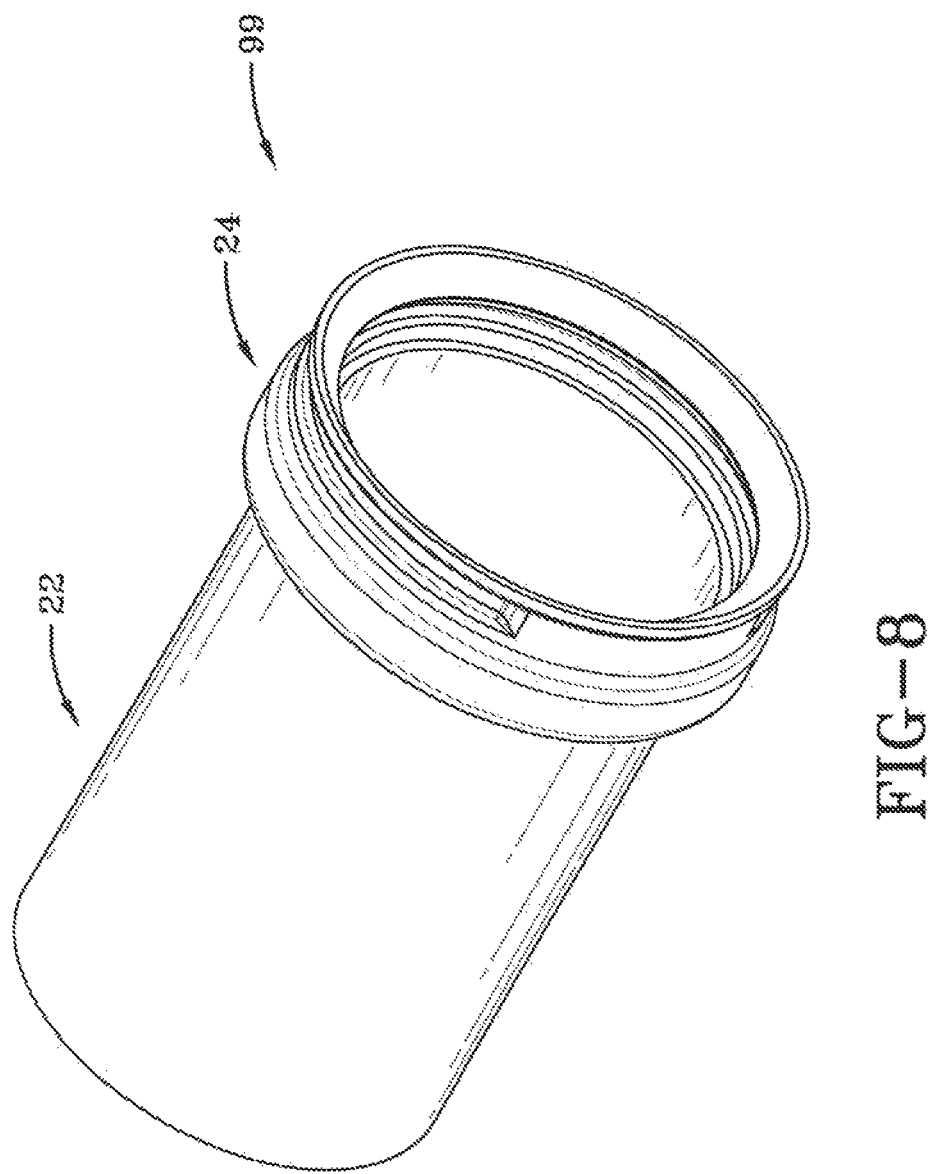
FIG. 8 is a perspective view of a sub-assembly showing the tubular body and the cuff according to the concepts of the present invention.
Figure 9:
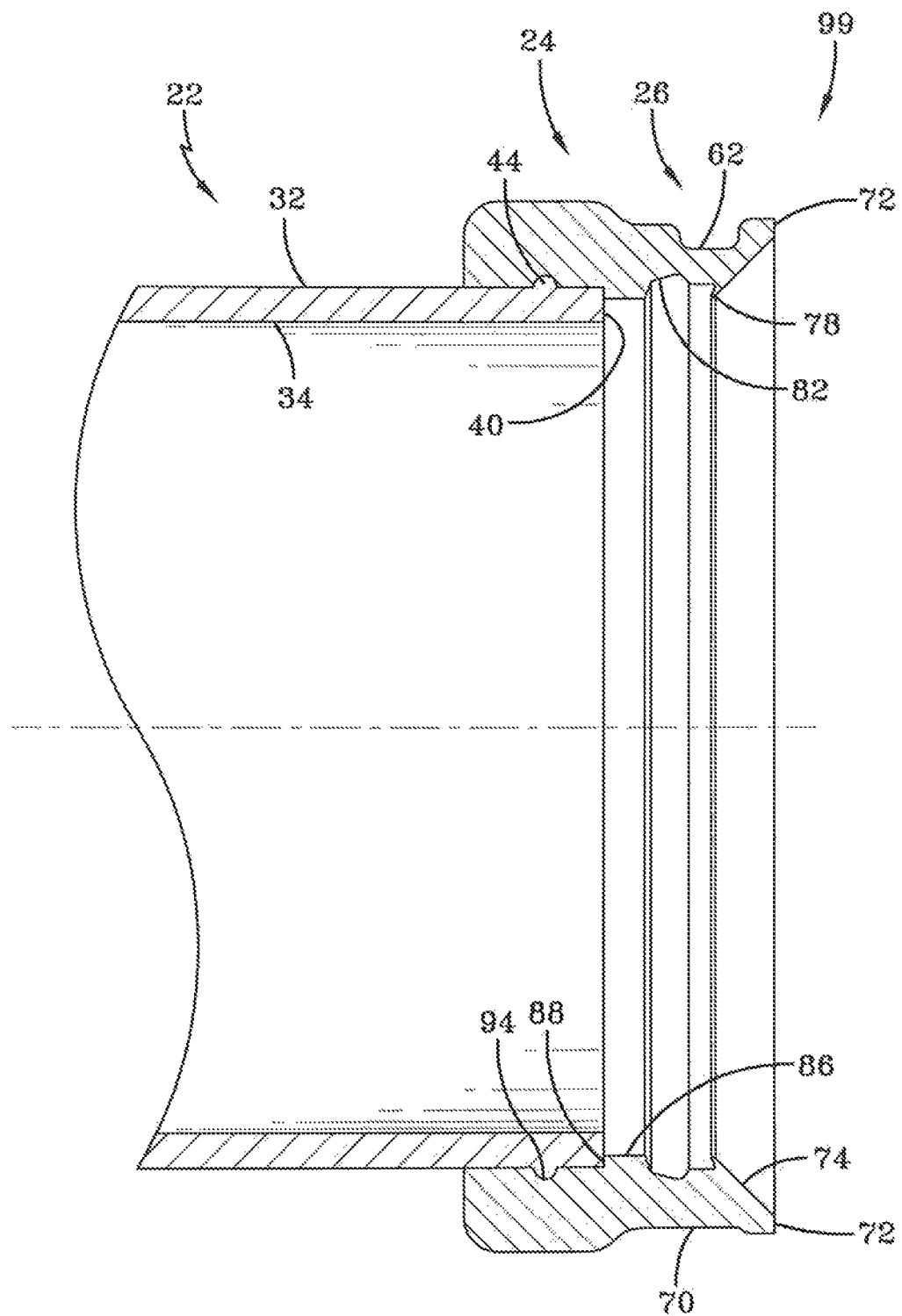
FIG. 9 is an enlarged cross-sectional view of the sub-assembly according to the concepts of the present invention.
Figure 10:
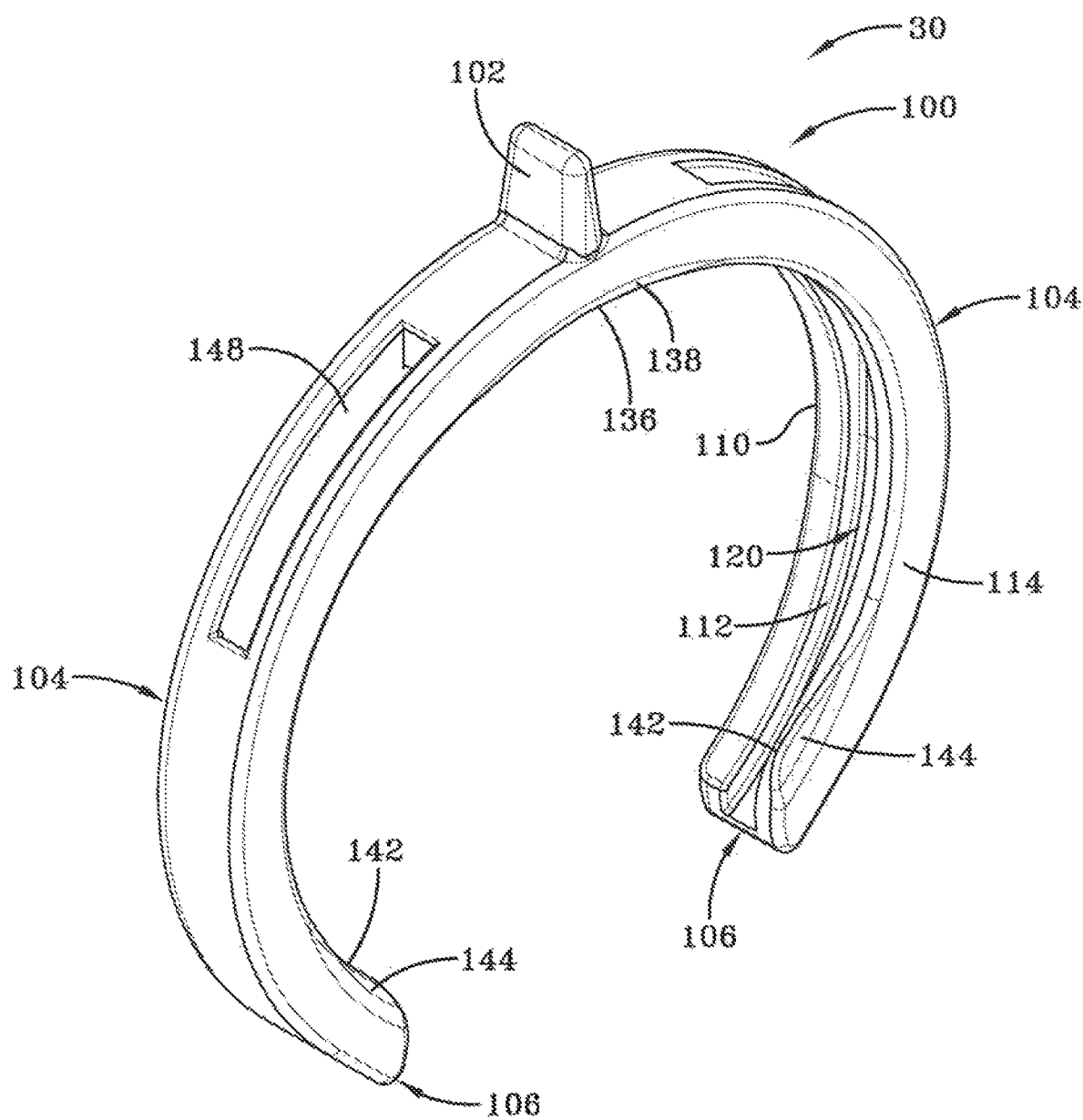
FIG. 10 is a front perspective view of a retaining clip utilized with the assembly according to the concepts of the present invention.
Figure 11:
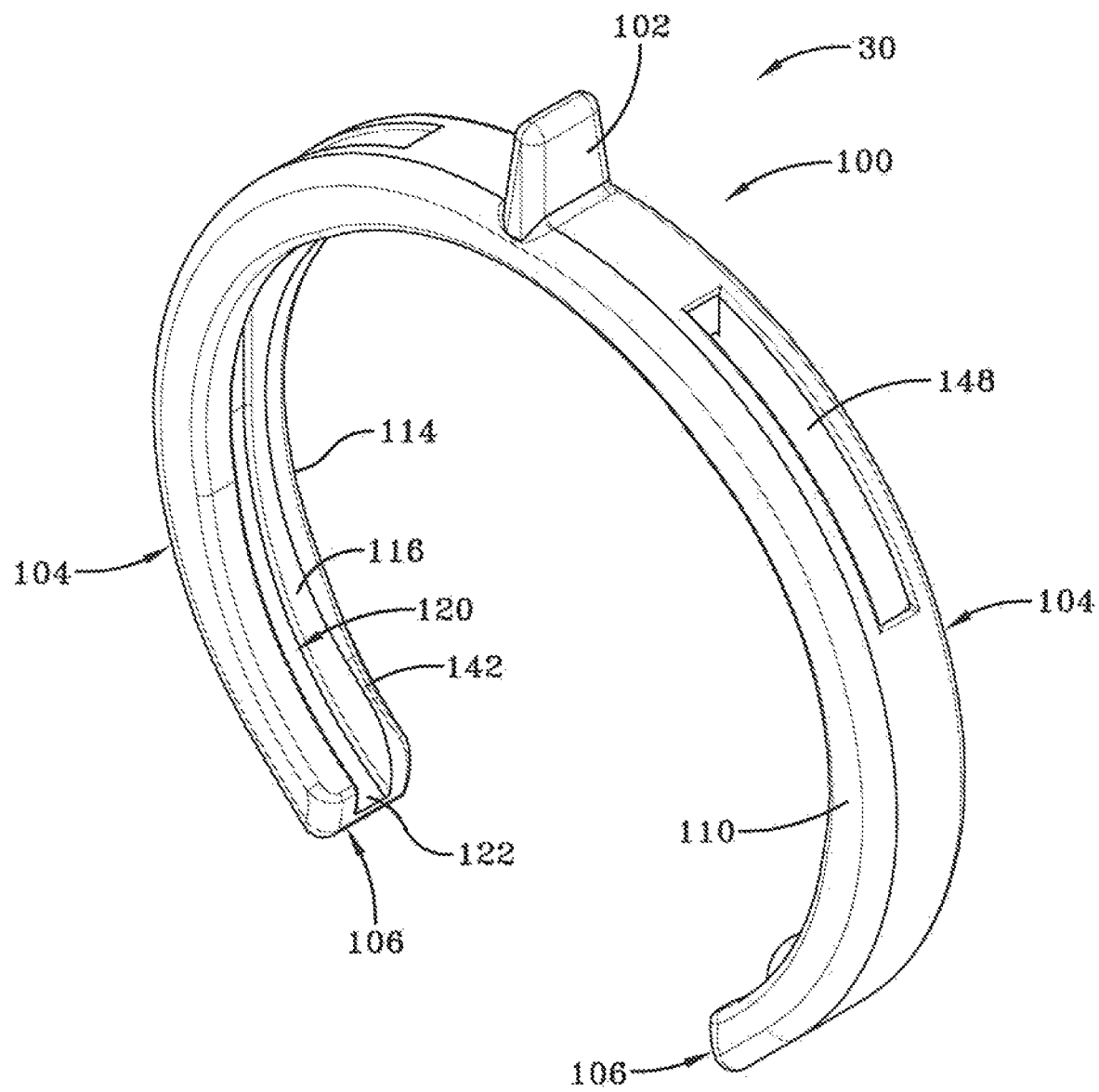
FIG. 11 is a rear perspective view of the retaining clip according to the concepts of the present invention.
Figure 12:
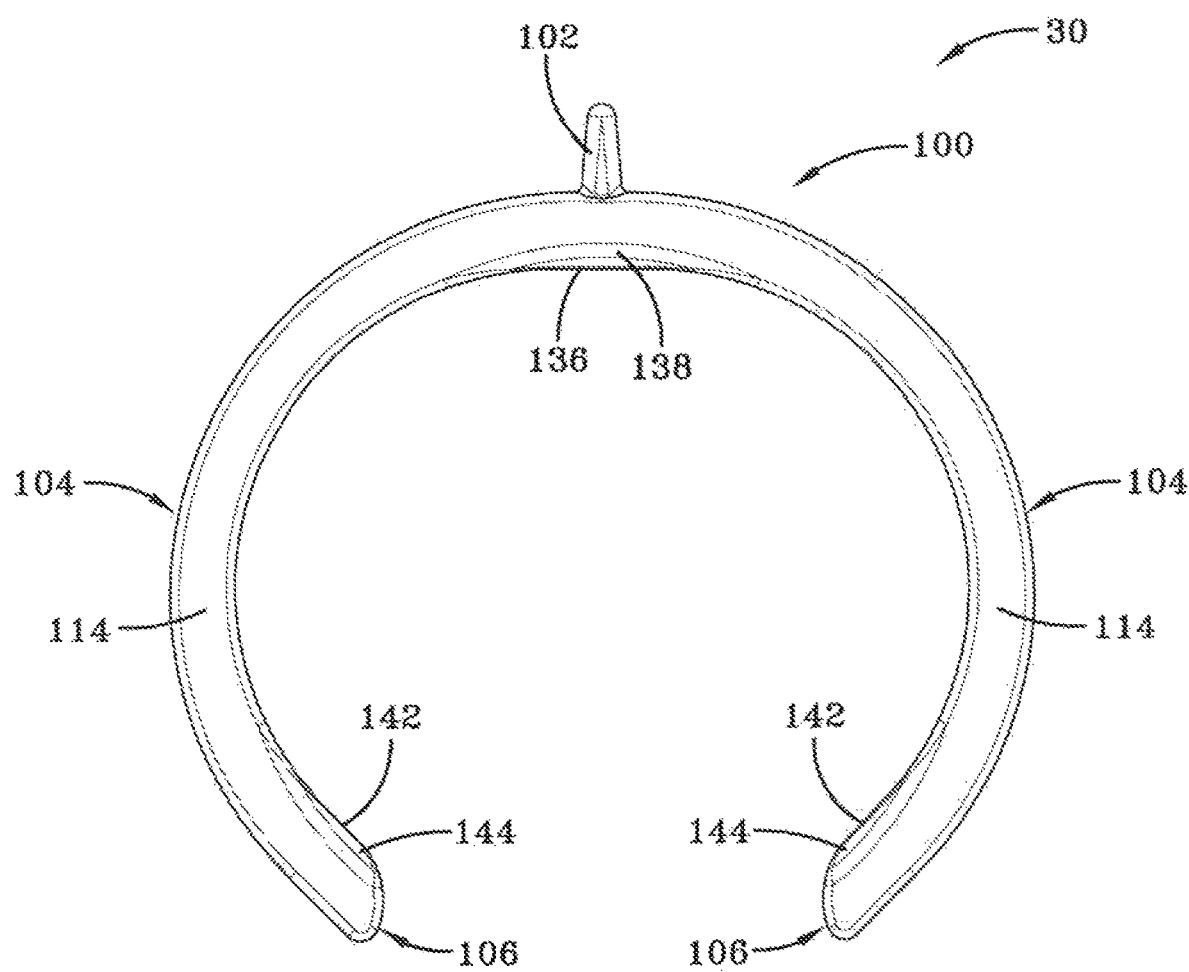
FIG. 12 is a front elevational view of the clip according to the concepts of the present invention.
Figure 13:
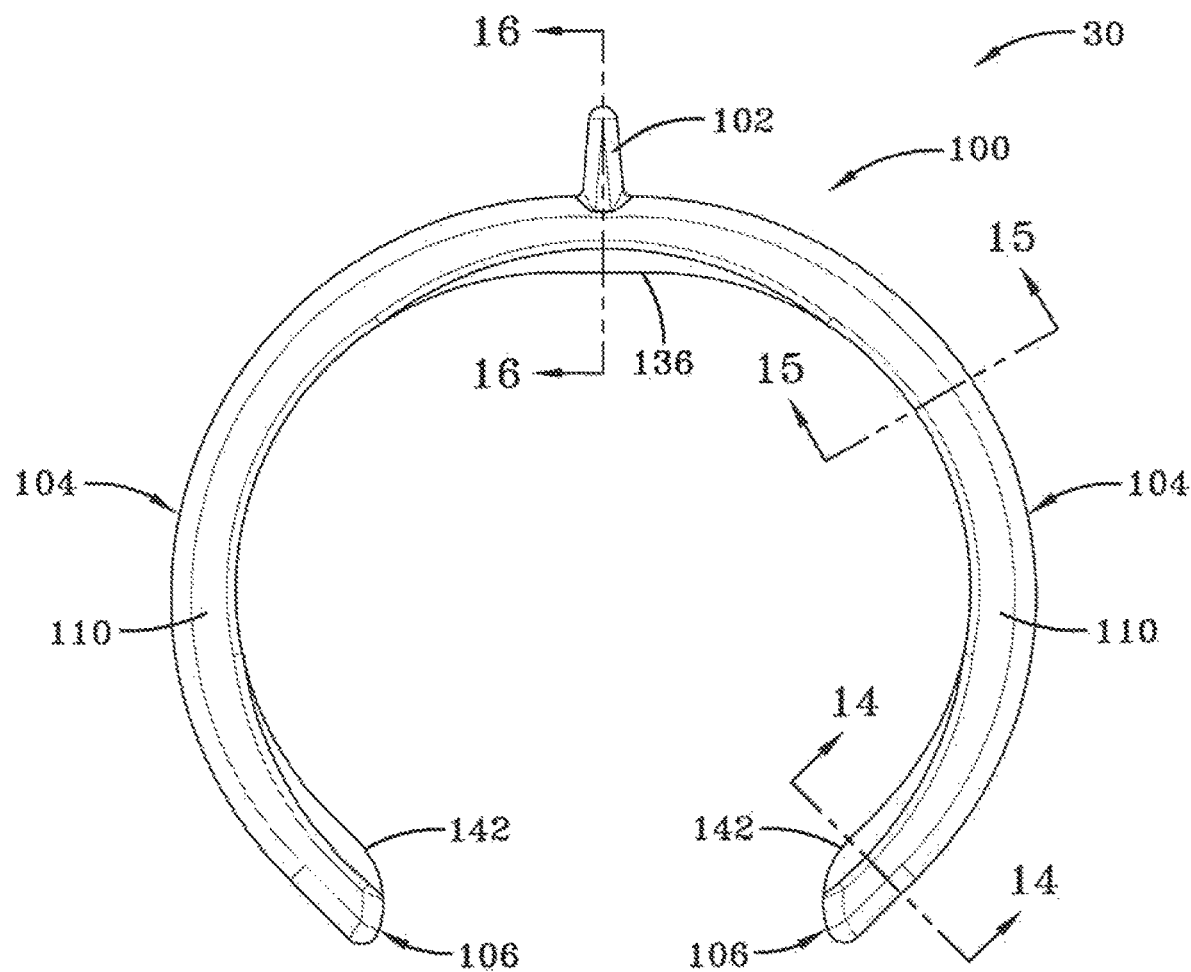
FIG. 13 is a rear elevational view of the clip according to the concepts of the present invention.
Figure 14:
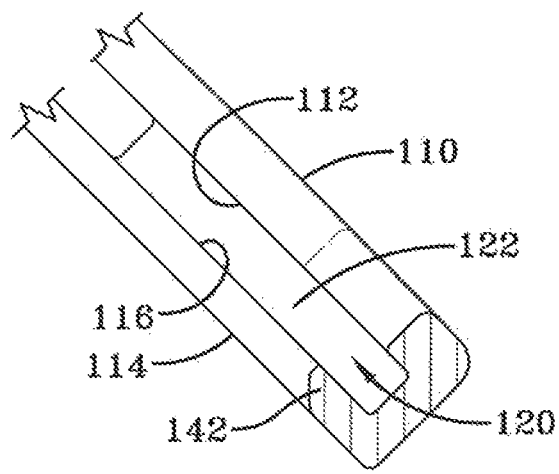
FIG. 14 is a cross-sectional view of the clip taken along lines 14-14 of FIG. 13 according to the concepts of the present invention.
Figure 15:
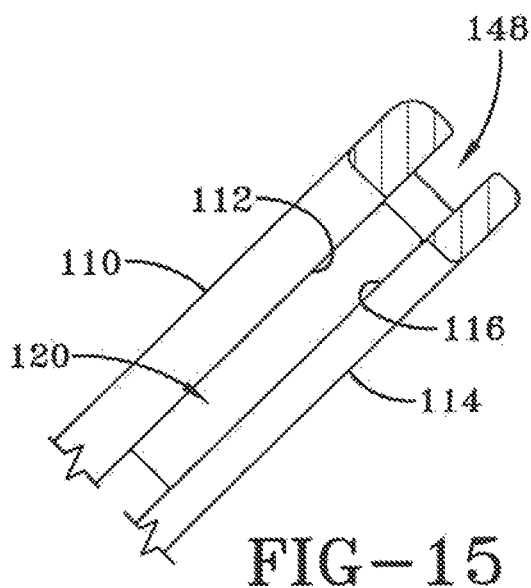
FIG. 15 is a cross-sectional view of the clip taken along lines 15-15 of FIG. 13 according to the concepts of the present invention.
Figure 16:
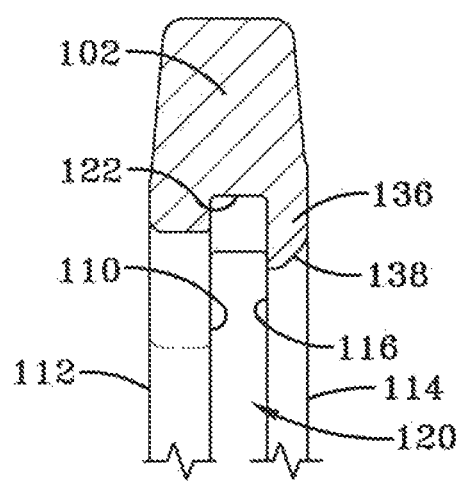
FIG. 16 is a cross-sectional view of the clip taken along lines 16-16 of FIG. 13 according to the concepts of the present invention.

Referring now to FIGS. 8 and 9, it can be seen that a sub-assembly is designated generally by the numeral 99. The sub-assembly is, in most embodiments, formed by placing the tubular body into a cuff body injection mold, wherein the tubular body 22 is inserted onto a core or mandrel or otherwise received in an injection mold whereupon the material utilized to form the cuff is injected into the mold about the end of the tubular body so as to form the cuff 24. As a result, the tubular body 22 is chemically and mechanically secured to the cuff 24. As best seen in FIG. 9, the annular ring 44 of the tubular body 22 may be received in the cuff channel 94. Moreover, the cuff end 40 may abut and may be positioned substantially adjacent to the body stop surface 88.

In the embodiment shown, the cuff body is formed by an injection molding process over-molded to the tubular body 22. However, skilled artisans will appreciate that other manufacturing procedures could be utilized to secure the cuff to the tubular body. These other procedures may include, but are not limited to mechanical or adhesive attachments, spin-welding, or other heat securement processes. However, it is believed that the injection molding process provides both cost and structural benefits over the other aforementioned processes.

Referring now to FIGS. 10-16, it can be seen that the retaining clip is designated generally by the numeral 30. Briefly, the retaining clip 30 is utilized to secure the sub-assembly 99 to the receiving port 28. In one embodiment, the retaining clip 30 is pre-installed onto the sub-assembly 99. By virtue of the structural configuration of the clip 30, which will be described in detail, the clip pre-assembled to the sub-assembly 99 may be axially installed onto the receiving port 28. In the alternative, the sub-assembly 99 may be installed onto the receiving port 28 and then the clip 30 is installed. In either scenario, the clip 30 functions to retain the sub-assembly onto the receiving port. If it is desired to remove the sub-assembly from the receiving port, the clip 30 may be removed. The clip may be removed by radially pulling on the clip or by rotating the clip so as to disengage it from the exterior groove 26. Details of the assembly and dis-assembly processes will be discussed in further detail.

The clip 30 provides a clip body 100 which may be constructed of a polymeric material. In some embodiments the material used to form the clip body 100 may be the same as utilized to form the tubular body 22. Other materials that may be used for the clip body include, but are not limited to, BASF Ultramid 8202, which has hardness value of 121 Shore R; Lyondell Bessel Pro-Fax SB891, which has a hardness value of 78 Shore D; and DuPont Zytel 80G14AHS which has a hardness value of 120 Shore R. Accordingly, in some embodiments the material used for the clip 30 may have a hardness value ranging anywhere from about 70 Shore A to about 130 Shore R, and in other embodiments from about 90 Shore A to about 121 Shore R. The clip body, which is C-shaped, provides for a centrally disposed and outwardly radially extending tab 102. As shown in the drawings, the tab 102 is substantially perpendicular with the body 100, but may be angularly orientated in other embodiments. Extending from both sides of the tab 102 are a pair of arcuate fingers 104. These arcuate fingers 104 form the C-shape. It will be appreciated that each of the arcuate fingers 104 provide a tip 106 at a distal end. The tips 106 may form an angular opening that in one embodiment is somewhere between 30° and 45°. Skilled artisans will appreciate that the opening could be as large as 175° and as small as 25°. The angular opening may be dependent upon the material utilized in the formation of the clip, the size of the cuff upon which the clip will be received, and other factors.

Each arcuate finger 104 includes a cuff wall 110 that extends from the clip body 100 where in the cuff wall 110 provides a wall surface 112. Spaced apart from the cuff wall 110 is a retention wall 114 which also extends from the clip body 100. The walls 110 and 114 may extend in the same direction from the clip body and the retention wall 114 provides a wall surface 116 that faces the wall surface 112. Formed between the walls 110 and 112 is a rim groove 120 which provides for a groove wall surface 122 that connects and is substantially perpendicular to both the wall surface 112 and the wall surface 116.

The cuff wall surface 112 provides an inner diameter which is essentially circular, although a slight non-circular shape may be utilized. Indeed, the inner diameter is sized so as to match the diameter of the cuff groove upon which the clip is received. The retention wall 116 also provides for an inner diameter which also may be of a circular configuration, but which also may be provided in a slightly non-circular shape.

The retention wall 114 provides for a central protuberance 136 which is substantially opposite the tab 102. The protuberance 136 extends inwardly radially from the wall surface 116. The protuberance 136 may provide for a central chamfer 138. Each tip 106 includes an end protuberance 142 which extends radially inward from the respective retention wall 114. Each end protuberance 142 may provide for an end chamfer 144. In some embodiments, the arcuate fingers 104 may provide a body slot 148. The body slot 148 is substantially between the cuff wall surface 112 and the retention wall surface 116 and radially positioned somewhere between the tab 102 and the respective tips 106. The body slot is ostensibly provided for allowing the manufacturer to form the clip in an injection mold; however, the configuration of the body slot may contribute to the spring force exerted by the clip. In other words, by adjusting the length of each slot 142, either more or less spring force can be obtained for the clip.

Figure 17:
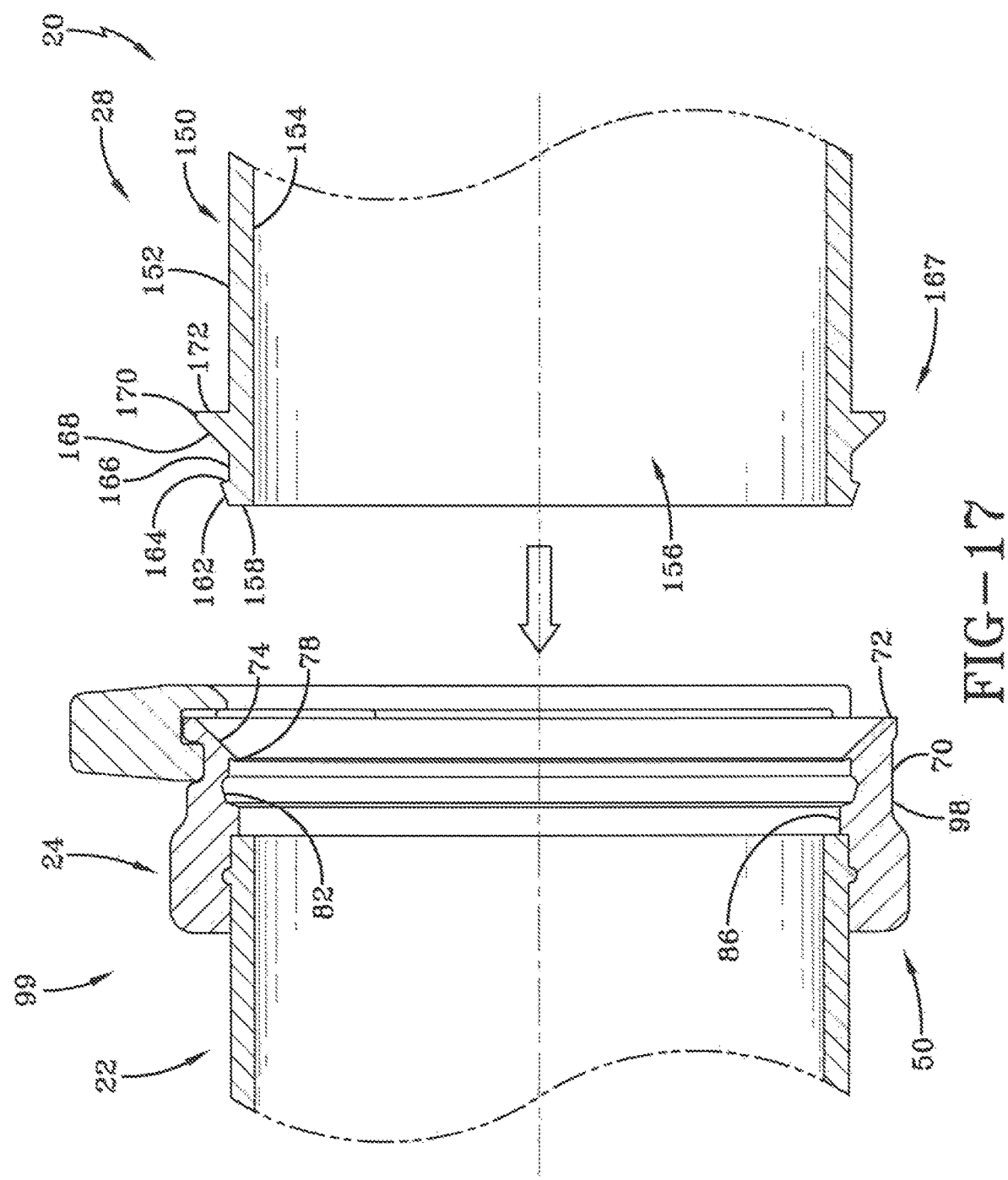
FIG. 17 is an exploded view of the sub-assembly and a receiving port upon which the sub-assembly is assembled according to the concepts of the present invention.

Referring now to FIGS. 17 and 18, it can be seen that the sub-assembly 99 is receivable on the receiving port 28. The receiving port 28 provides a tubular duct 150 which is sized to be received within the cuff 24. The tubular duct 150 provides an exterior surface 152 that is opposite an interior surface 154. The interior surface 154 provides an opening 156 that is contiguous with the duct opening 36 when the sub-assembly 99 is joined to the port 28. As skilled artisans will appreciate, the openings allow for the flow of air or other gaseous material between the tubular body 22 and the port 28. An end surface 158 connects the exterior surface 152 to the interior surface 154. In the present embodiment, the exterior surface 152 provides for an entry ramp 162 that angularly extends from the end surface 158. A catch surface 164 extends from the entry ramp 162 to the exterior surface 152. Skilled artisans will appreciate that the ramp 162 may be angular as shown or it may be configured such that the entry ramp is of a perpendicular configuration. In any event, the catch surface 164 extends into a collar surface 166 which is substantially of the same diameter as the exterior surface 152. Extending from the collar surface 166 is a chamfer ramp 168 which terminates at a ridge surface 170. Extending perpendicularly from the ridge surface 170 is a ridge wall 172 that terminates at the exterior surface 152.

As best seen in FIG. 18, when the receiving port 28 is received in the cuff 24 certain components of each part are aligned with one another. In particular, the entry ramp 162 is received in the channel 82 and the chamfer ramp 168 is positioned adjacent the chamfer 74. When the sub-assembly 99 and the port 28 are assembled to one another and secured to one another with the clip 30, the cuff rim 54 and the ridge wall 72 are both captured between the retention wall surface 116 and the cuff wall surface 112. In particular, the retention wall surface 116 is adjacent the ridge wall 172, and the groove sidewall 60 adjacent the cuff ring 54 is adjacent the cuff wall surface 112. The spacing between the surfaces is such that the mating parts are maintained in adjacent contact to one another.

Assembly of the sub-assembly 99 with the receiving port may be accomplished in two ways. In one embodiment, the clip 30 may be pre-installed onto the cuff. This may be done by slightly expanding the arcuate fingers 104 so as to be received onto the cuff such that the tips 106 are positioned to be in proximity to the groove endwalls 64. As such, the clip may be assembled shortly after the molding of the cuff onto the tubular body while the cuff material is still warm. The cuff material is somewhat more pliable than would otherwise be experienced and the retaining clip is easily disposed onto the cuff groove. This avoids the operation of pre-assembling a band clamp onto the cuff and utilization of a tool such as a screwdriver. Skilled artisans will appreciate that hand-assembly of the components is easily accomplished and in much less time. In any event, with the clip pre-assembled to the cuff, the sub-assembly 99 can be axially inserted onto the receiving port 28. In such an operation, the entry ramp 162 may engage the chamfers provided by the central chamfer 138 and the end chamfers 144. If such an engagement occurs, the clip 30 may expand radially outwardly and effectively increase its outer diameter so as to allow for the ramps 162 to pass adjacent the fin wiper 78 and into the channel 82. Skilled artisans will appreciate that the fin wiper 78 provides for a sealing surface against the collar surface 166. As the sub-assembly is further inserted onto the port 28, the chamfer ramp 168 engages the chamfer surfaces of the protuberances 136,142 to expand the clip radially outwardly. However, once the ridge surface 170 passes the protuberances, the clip and its associated spring force causes the retention wall to retract toward its normal size. This functions to capture the chamfer ramp 168 adjacent the chamfer 174 and, as such, the cuff is captured onto the receiving port 128 while also providing for a secure seal between the two components.

In some embodiments, depending upon the sizing of the rim groove 120 (the space between the wall surfaces 112 and 116), the retention wall 114 and the cuff wall 110 may exert a compressive force on the sidewall 60 of the cuff rim 54 and the ridge wall 172.

In an alternative assembly procedure, the sub-assembly 99, without the clip, is axially positioned onto the receiving port 28. In this manner, the entry ramp 162 is received in the channel 68 and the chamfer ramp 168 is positioned adjacent the chamfer 74. At this time, a technician will spread apart the retaining clip and position it such that the cuff ring 54 and the ridge surface 170 and ridge wall 172 are received between the wall surfaces 112 and 116. The fin wipers function as previously described and provide a seal of the cuff onto the collar surface 166. The positioning of the sub-assembly and the receiving port, when assembled to one another, is the same as described in the previous embodiment.

Removal of the retaining clip is essentially performed in the reverse manner of the embodiments described above. In one embodiment, a technician may simply grasp the tap 102 and pull radially. This forces the fingers 106 to expand the arcuate fingers 104 until such time that the tips 106 pass the largest portion of the outer diameter of the cuff groove.

In another embodiment, the technician rotates the tab 102 such that one of the fingers 106, and in particular the cuff wall 110, engages the adjacent groove endwall 64 and then the clip expansion surface 70. This can best be seen in FIGS. 19A-D. FIG. 19A shows a cross-section of the clip and, in particular, the cuff wall surface 112. FIG. 19B shows the cuff, and in particular the cuff surface 62, one of the groove sidewalls 60, and how the surface 62 is terminated at the groove endwalls 64. This view further illustrates that the groove endwall 64 may be tapered so as to transition the cuff surface 62 into the clip expansion surface 70. FIG. 19C shows the clip received in the cuff groove 26 and further illustrates the positional relationship between the tips 106 of the arcuate fingers 104 and the groove endwalls 64. As shown in FIG. 19C, the spacing between the tips 106 is identified as width W1. As previously discussed, this spacing provides for a compressive force about the cuff so as to seal about the receiving port. In any event, dislodging of the clip is accomplished by rotating the clip, and in particular the tab 102, in a clockwise or counter-clockwise direction. This rotation forces the tip, and in particular the cuff wall 110, to engage the clip expansion surface 70. As shown in FIG. 19D, this causes the tips to expand to a dimension of width W2 which is larger than width W1. Skilled artisans will appreciate that the width dimensional values are particular to the size of the receiving port and the cuff and may be modified as needed, depending upon the size of the receiving port and cuff. In any event, once the tips, and in particular the cuff wall, are supported by the cliff expansion surface, the technician may exert an axial force so as to move the cuff wall onto the cuff expansion ring 98 shown in the other drawings. This effectively disengages the clip from the cuff grove and the technician further applies an axial force which completely disengages the clip from the cuff. As previously noted, the clip expansion surface 70 has the same outer diameter as the cuff expansion ring 98, such that as one of the fingers passes onto the clip expansion surface 70, it expands to a diameter that allows for it to be axially removed and positioned off of the interconnection between the cuff and the tubular body. Once this occurs then the retaining clip can be spread apart and easily removed. This then allows for the sub-assembly 99 to be axially withdrawn from the receiving port 28.

Based on the foregoing, the advantages of the embodiment described above are readily apparent. The wiper fin allows for sealing onto the receiving port and allows for the cuff to be constructed from a relatively soft and flexible material so as to provide a circumferential seal around the receiving port. The fin size and the number of fins can be optimized for particular applications and the fin configuration may be configured to adapt to any changes in position or vibration of the receiving port or sub-assembly. Yet another advantage of the present invention is that it allows for quick assembly of the clip to the tubular body and for quick assembly of the sub-assembly to the receiving port. No tooling is required for such a configuration and, as a result, a cost savings is realized in the assembly of both the clip to the cuff, and in the sub-assembly to the receiving port. By utilizing a polymeric material for the clip it will be appreciated that no metallic components are required and this eliminates the possibility of metallic corrosion in the engine compartment, facilitates recycling and potentially lowers the overall weight of the assembly.

Figure 20A:
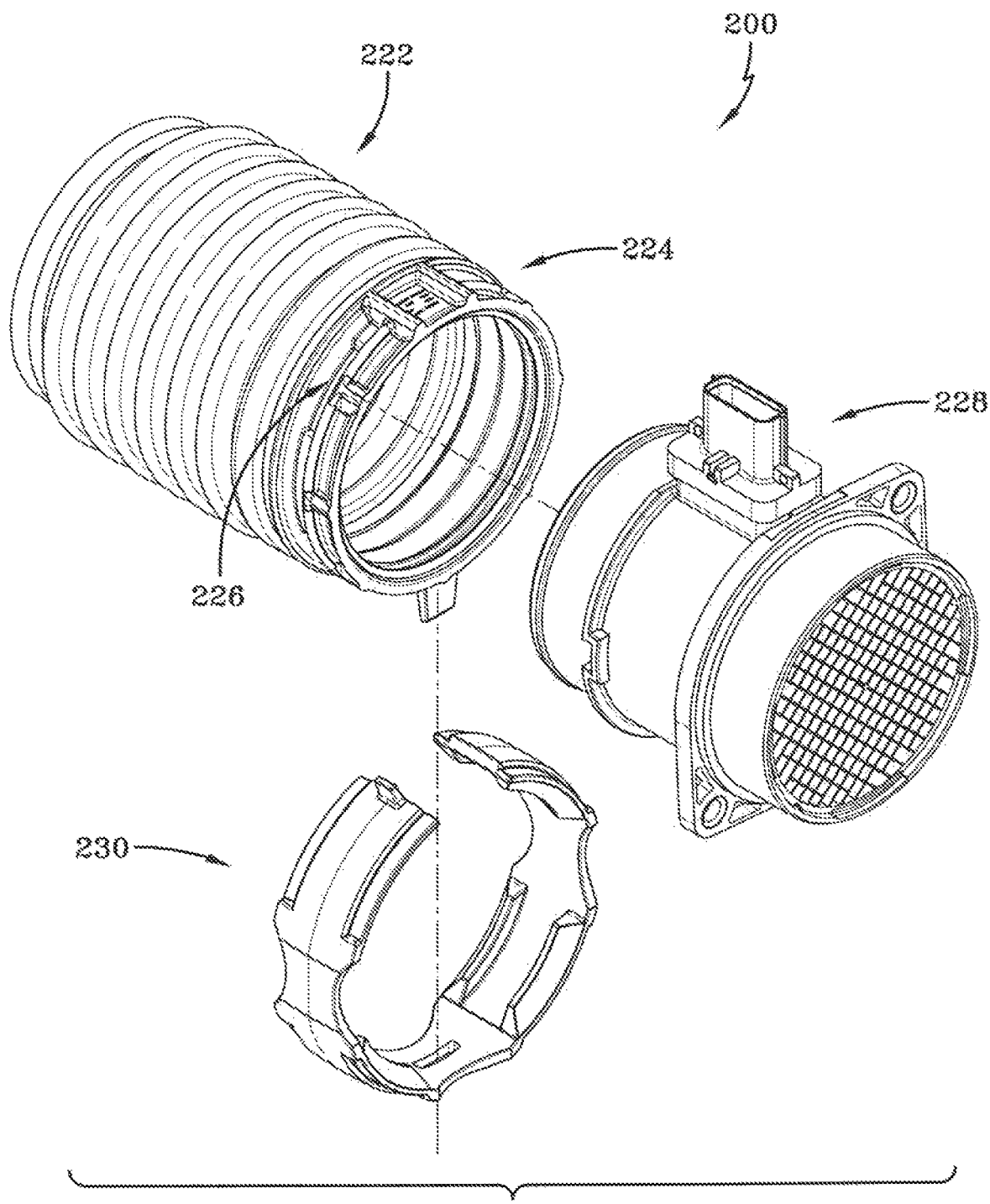
FIG. 20A is an exploded perspective view of an alternative clean air duct and retaining clip assembly made in accordance with the concepts of the present invention.
Figure 23:
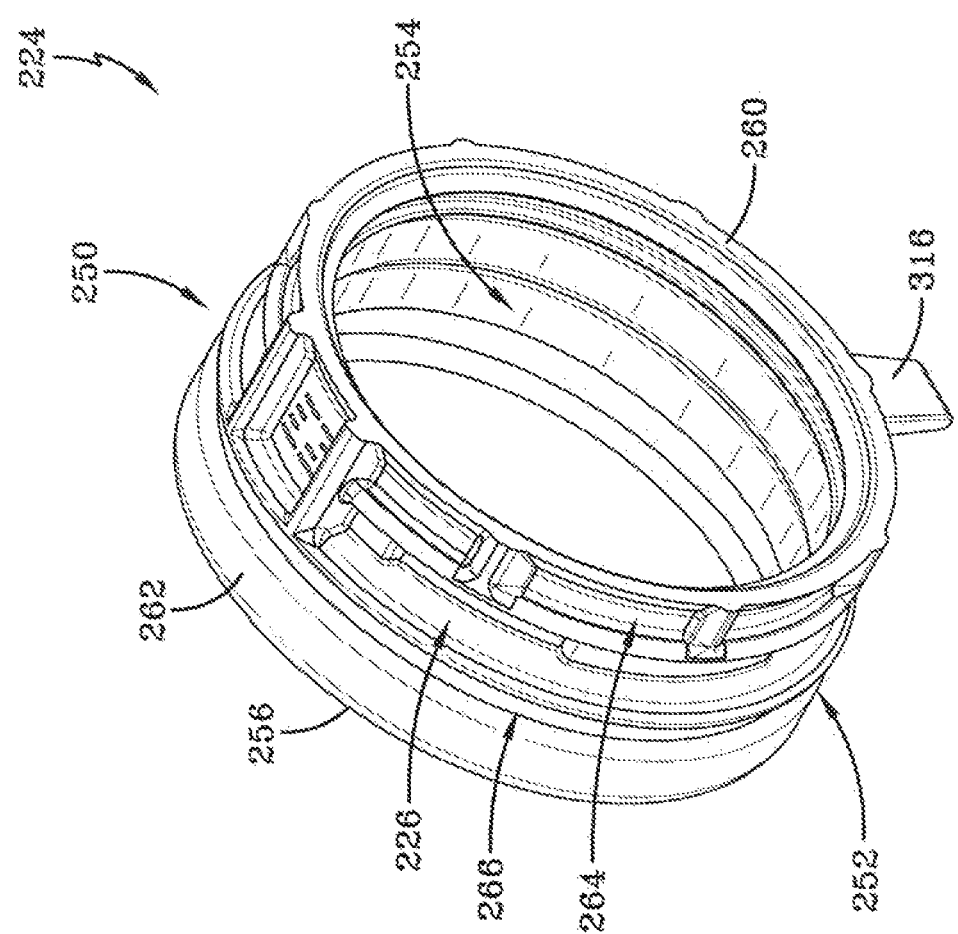
FIG. 23 is a perspective view of a cuff used in the alternative assembly according to the concepts of the present invention.

Referring now to FIGS. 20A and 20B it can be seen that an alternative clean air duct and retaining clip assembly is designated generally by the numeral 200. The assembly 200 provides an air duct connection to an air filter, engine compartment, a throttle body or other similar structure. As in the previous embodiment, the present assembly may be used with automobile engine compartments, and skilled artisans will appreciate that the duct and associated assembly disclosed herein may be utilized in any environment where air or a gas needs to be transferred from one component to another and in such a way so as to seal the duct and prevent external contaminants from entering. Moreover, the retaining clip assembly and associated air duct are configured so as to facilitate attachment to a port and to provide a long-lasting and secure connection between the two. Additionally, the clip is configured so as to provide for easy removal of the air duct for when servicing of the engine compartment is required. The alternative assembly 200 is similar to the assembly 20 except that the clip and mating cuff and receiving port are modified to further isolate a sealing interface between the cuff and the receiving port from vibrations imparted by the air duct.

Generally, the assembly 200 comprises a tubular body 222 which has a cuff 224 secured to and around an end of the tubular body. The cuff 224 provides an exterior retention groove 226 about its outer circumference. The tubular body and the cuff, which may be referred to as an air duct or sub-assembly, are received on to a receiving port 228. A clip, designated generally by the numeral 230, may be pre-installed on the cuff or installed after the cuff is assembled to the receiving port. The clip functions to secure the air duct to the receiving sport so as to provide a secure and air-tight connection therebetween. Skilled artisans will appreciate that the cuff and the clip are configured to allow for repeated attachments and detachments of the tubular body and cuff from the receiving port. Moreover, the parts are configured to maintain a secure and air-tight connection over many attachments and detachments.

Referring now to FIGS. 21 and 22, it can be seen that the tubular body 222 includes an exterior surface 234 that is opposite an interior surface 236. The interior surface forms a body opening 238 which allows for transfer of air or other gaseous materials between ends of the tubular body. The body 222 may be configured with a plurality of pleats which allows for flexibility of the tubular body. However, in other embodiments a combination of pleats and smooth surfaces or an entirely smooth surface may be provided by the tubular body. In any event, the tubular body 222 includes a cuff end 242 which connects the exterior surface 234 to the interior surface 236. Each cuff end may provide for an inwardly extending lip 244 that extends from an annular ring 246. The inwardly extending lip and annular ring assist in securing the tubular body 222 to an over molded cuff as disclosed in U.S. Pat. No. 5,682,924, which is incorporated herein by reference. Other embodiments may employ a different cuff end configuration as deemed appropriate. The tubular body 222 may employ the same materials as utilized in the tubular body 22 of the previously described embodiment.

Referring now to FIGS. 23-26, it can be seen that the cuff is designated generally by the numeral 224. As in the previous embodiment, the cuff 224 may be molded or otherwise secured to the tubular body 222. The cuff provides a cuff body 250 which may be constructed of polymeric material and, in particular, a polymeric material which, in most embodiments, is relatively softer than the polymeric material utilized for the tubular body. The materials that may be used for the cuff body 250 are the same as those utilized for the cuff body 50 of the previously described embodiment.

The cuff body 250 includes a cuff body exterior surface 252 and a corresponding cuff body interior surface 254. An end surface 256 connects the exterior surface to the interior surface 254 at one end and at an opposite end a rim end 260 connects the surfaces 252 and 254 to one another. The cuff body exterior surface 252 comprises three major exterior sections between the end surface 256 and the rim end 260. Starting at the end surface 256, the cuff body includes a collar 262, which makes up the first major section and which is primarily connected to the tubular body 222. A retention groove 226 (the second major exterior section) is adjacent the collar 262 and a sealing section 264 (the third major section) is adjacent the retention groove 226 and terminates at the rim end 260. A channel 266 may be provided between the collar 262 and the retention groove 226.

The retention groove 226 comprises an inward groove ramp 270 which may extend inwardly from the collar 262 or a top edge of the channel 266. Extending from the groove ramp 270 is a groove surface 272. The groove surface 272 extends almost entirely about the entire circumference of the cuff. However, the groove surface 272 may be interrupted in sections and in particular by groove steps 274 which may be substantially perpendicular or tapered with respect to the groove surface 272. The groove steps 274 are connected to step surfaces 276 which also extend around the circumference of the cuff in sections. Axially opposite the inward groove ramp 270 is a groove sidewall 278 which extends up to the sealing section 264. Together, the groove surface 272, the adjacent groove steps 274, the connected groove ramp 270 and the connected sidewall 278 define a strut pocket 280. Any number of strut pockets 280 may be provided about the outer circumference of the cuff body 252.

Axially adjacent the retention groove 226 is the sealing section 264 which extends from the groove sidewall 278 to the rim end 260. The sealing section 264 includes a sealing rib 288 which extends substantially around the outer circumference of the cuff and is connected to the groove sidewall 278. A somewhat reduced diameter end collar 290 extends from a bottom edge of the sealing rib 288. An increased diameter sealing lip 292 extends from the end collar at an edge opposite the sealing rib 288 and is connected to the rim end 260. In some embodiments a plurality of transverse ribs 294 may extend from the sealing rib 288 to the sealing lip 292. The transverse ribs provide for structural support to the sealing lip 292 and the sealing rib 288. Skilled artisans will appreciate that the void formed between the sealing rib 288 and the sealing lip 292 reduces the weight of the cuff.

The cuff body interior surface 254 provides three major interior sections that are somewhat aligned with the exterior sections described above. The cuff body interior surface 254 comprises a sealing surface 296, which extends from the rim end 260; a retention section 298 adjacent the sealing surface 296; and a collar attachment section 300 adjacent the retention section 298, wherein the collar attachment section 300 extends from the end surface 256. The sealing surface 296 extends from the rim end 260 and includes a chamfer entry surface 302. The sealing surface 296 may also include at least one radial wiper 304. The radial wiper 304 extends about the entire inner periphery of the sealing surface and may be oriented in a direction aligned with the chamfer entry surface 302. In other words, the wipers are intentionally of a diameter that is somewhat less than the outer diameter of the receiving port, as will be discussed. Accordingly, insertion of the cuff onto the receiving port causes the radial wipers 304 to be deflected onto the sealing surface 296 and, in particular onto the cuff body interior surface 254. In some embodiments the wiper 304 may have an adjacent recess 305 which receives the wiper when deflected by a receiving surface. Extending from the sealing surface 296 is a retention surface 308 which is of a somewhat smaller or equivalent outer diameter as the diameter of the receiving port. The retention surface 308 may be contoured or shaped so as to match the exterior shape of the receiving port. The retention surface 308 may include a retention ramp 309 that transitions the retention section 298 to the collar attachment section 300. Adjacent the retention surface 308 is a collar surface 310 which conforms to the inwardly extending lip and annular ring that may be provided by the tubular body to which the cuff is attached. As described in the previous embodiment, the collar attachment section 300 provides for an integral and leak-proof seal between the tubular body and the cuff body 250.

Figure 28:
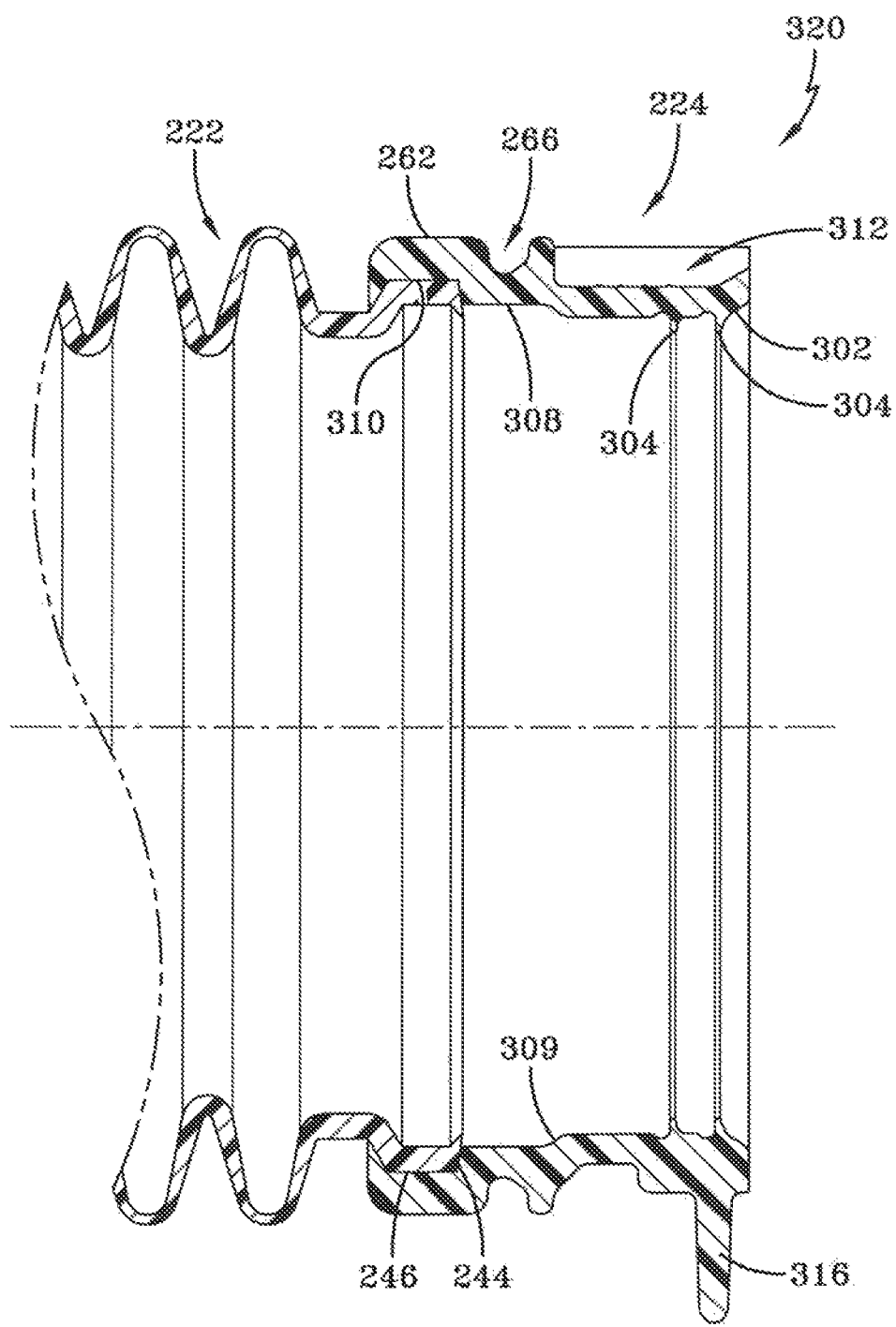
FIG. 28 is a cross-sectional view of a connection area of the sub-assembly used in the alternative assembly according to the concepts of the present invention.

In some embodiments, the exterior of the cuff body may provide for a lateral orientation gap 312. The lateral orientation gap is defined by a pair of lateral ribs 314 which are of the same effective diameter as the sealing ribs 288 but which extend from the rim end 260 to the inward groove ramp 270. As such, the lateral orientation gap 312 is defined by the lateral ribs 314 and a portion of the inward groove ramp 270. In a position diametrically opposite the lateral orientation gap 312, the cuff may provide a cuff finger 316 which may be utilized in aligning the tubular body within the retaining clip as will be described. In any event, the assembly of the cuff body 250 to the tubular body 222 provides for a sub-assembly designated generally by the numeral 320 as best seen in FIGS. 27 and 28.

Referring now to FIGS. 29-33, it can be seen that the retaining clip is designated generally by the numeral 230. Briefly, the retaining clip is utilized to secure the sub-assembly 320 to the receiving port 228. The clip 230 provides for a clip body 330 wherein the body materials are substantially the same as the clip body 100 provided in the previous embodiment. The clip 230 is substantially arcuate or C-shaped, wherein a tab 332 may radially extend from one end of the body 330. The body 330 includes an external surface 334, and a port edge 336 opposite a cuff edge 338 that also extends from the external surface 334. Either one or both of the edges 336 and 338 may be provided with edge grooves 340 which serve to reduce the amount of material used to form the body 330. In any event, an internal surface 342 is opposite the external surface 334, wherein the surfaces 334 and 342 are connected to one another by the respective edges 336 and 338. The surfaces 334 and 342 are also connected at end surfaces 343 which face one another so as to form a gap 344 therebetween. As best seen in FIGS. 29 and 30, the tab 332 extends from the external surface 344 at one of the end surfaces 343.

Extending radially inwardly from the internal surface 342 may be a plurality of struts wherein in the embodiment shown the struts are positioned adjacent the port edge 336 and the cuff edge 338. However, skilled artisans will appreciate that in some embodiments the struts may be somewhat displaced from their respective edges.

Along the port edge 336 are a plurality of port struts 345. Although four port struts are shown, it will be appreciated that any number of struts may be employed. Each strut 345 provides for a port ramp 346 which may extend angularly inward from the port edge 336. Substantially perpendicular to the port ramp 346 is a port strut surface 348 which may be substantially concentric with the internal surface 342. Further extending from the port strut surface is a port catch 350 which extends from the surface 348 to the internal surface 342. Either or both of the port ramp 346 and the port catch 350 may be angularly inclined so as to facilitate engagement by the receiving port as will be described. In the embodiment shown, the port ramp 346 is at an angle less than 90° with respect to the external surface 334 to facilitate outward radial deflection of the cuff body and the port catch 350 may be substantially perpendicular to the internal surface 342 so as to assist in securing the cuff to the receiving port as will be explained.

Figure 31:
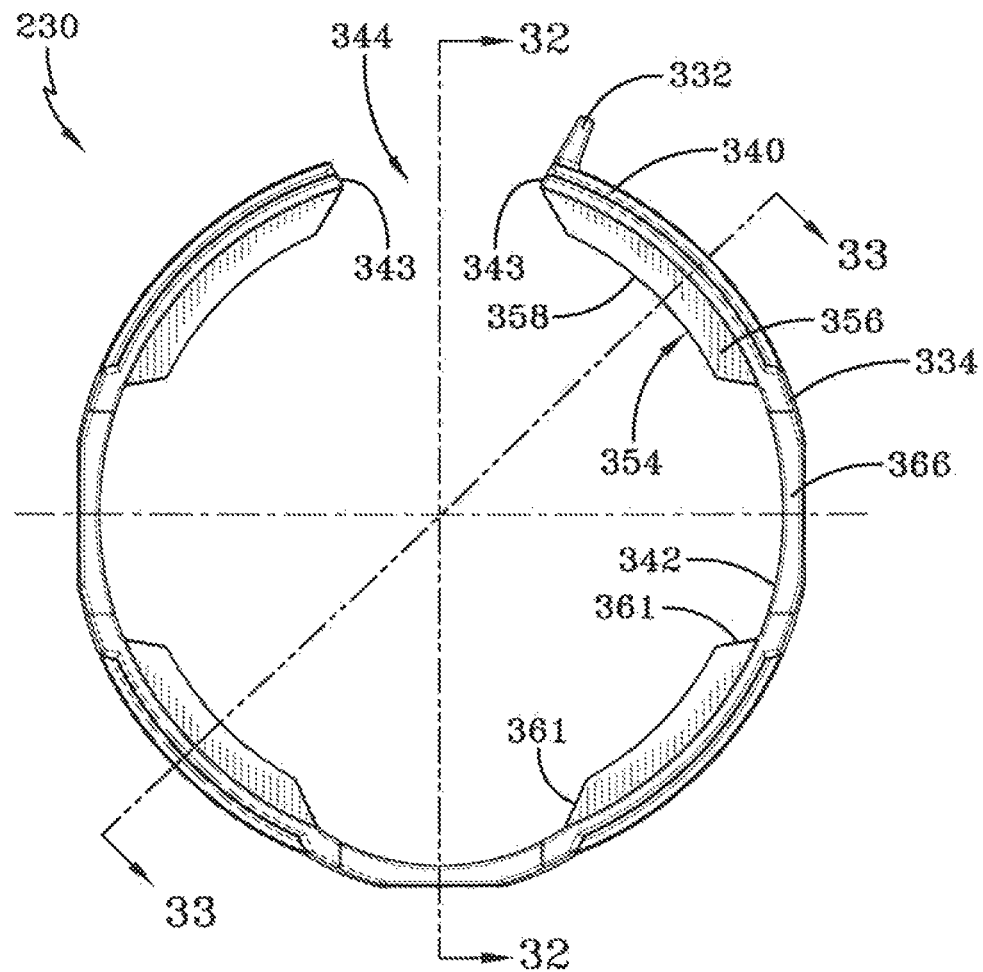
FIG. 31 is an elevational view of the retaining clip according to the concepts of the present invention.
Figure 33:
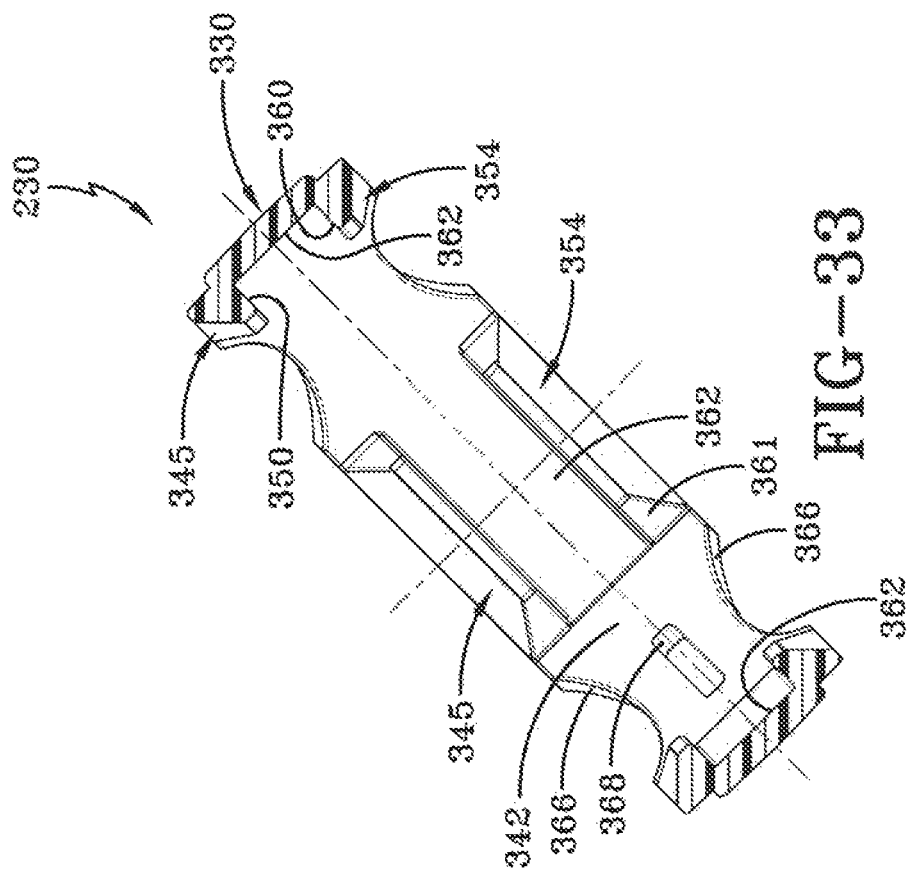
FIG. 33 is a cross-sectional view of the retaining clip taken along lines 33-33 of FIG. 31 according to the concepts of the present invention.
Figure 32:
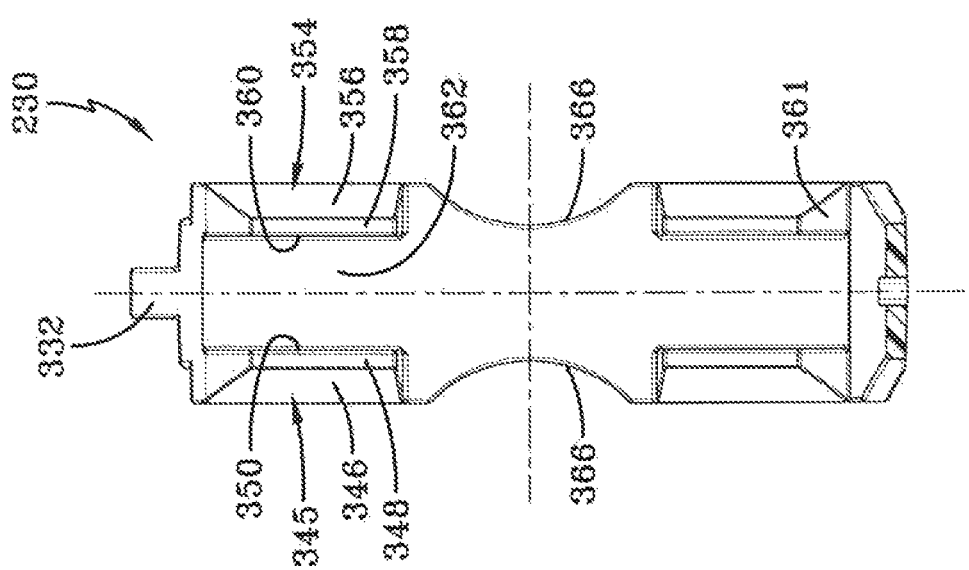
FIG. 32 is a cross-sectional view of the retaining clip taken along lines 32-32 of FIG. 31 according to the concepts of the present invention.
Figure 34:
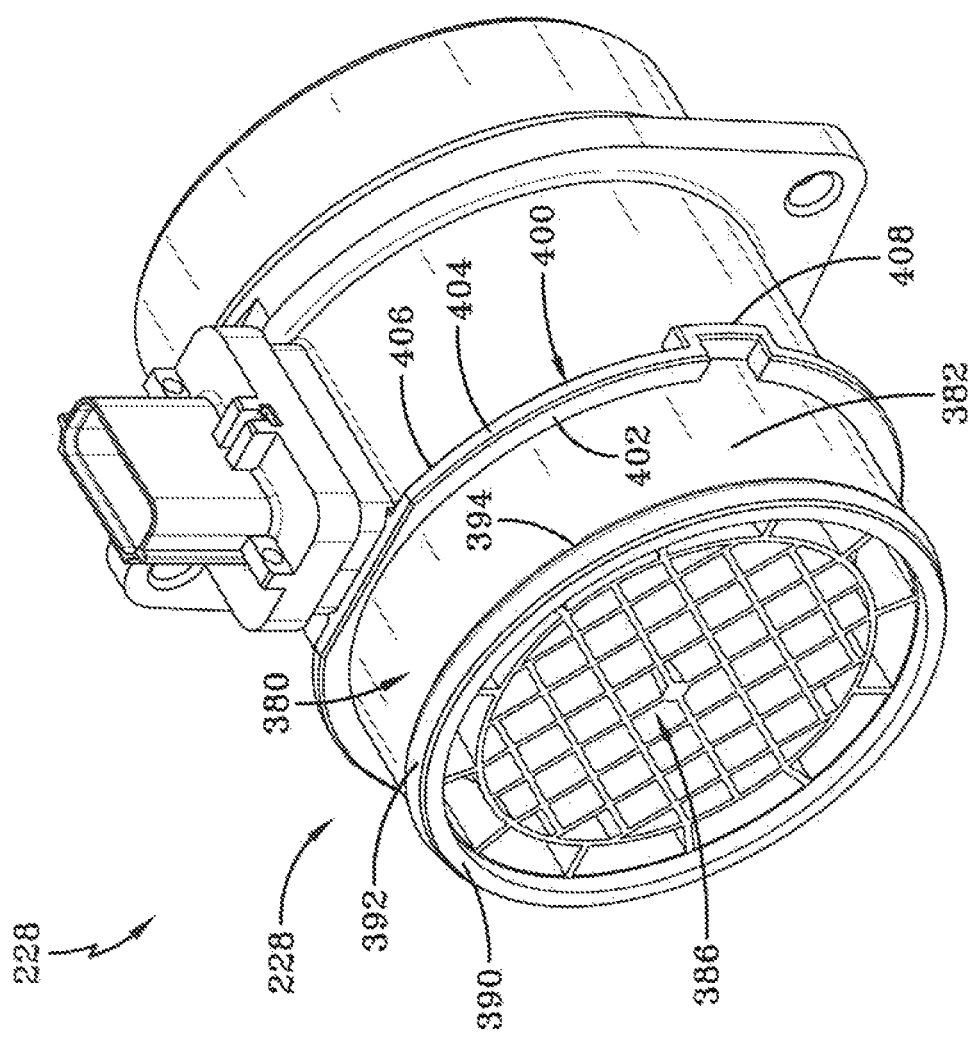
FIG. 34 is a perspective view of a receiving port utilized in the alternative assembly according to the concepts of the present invention.
Figure 35:
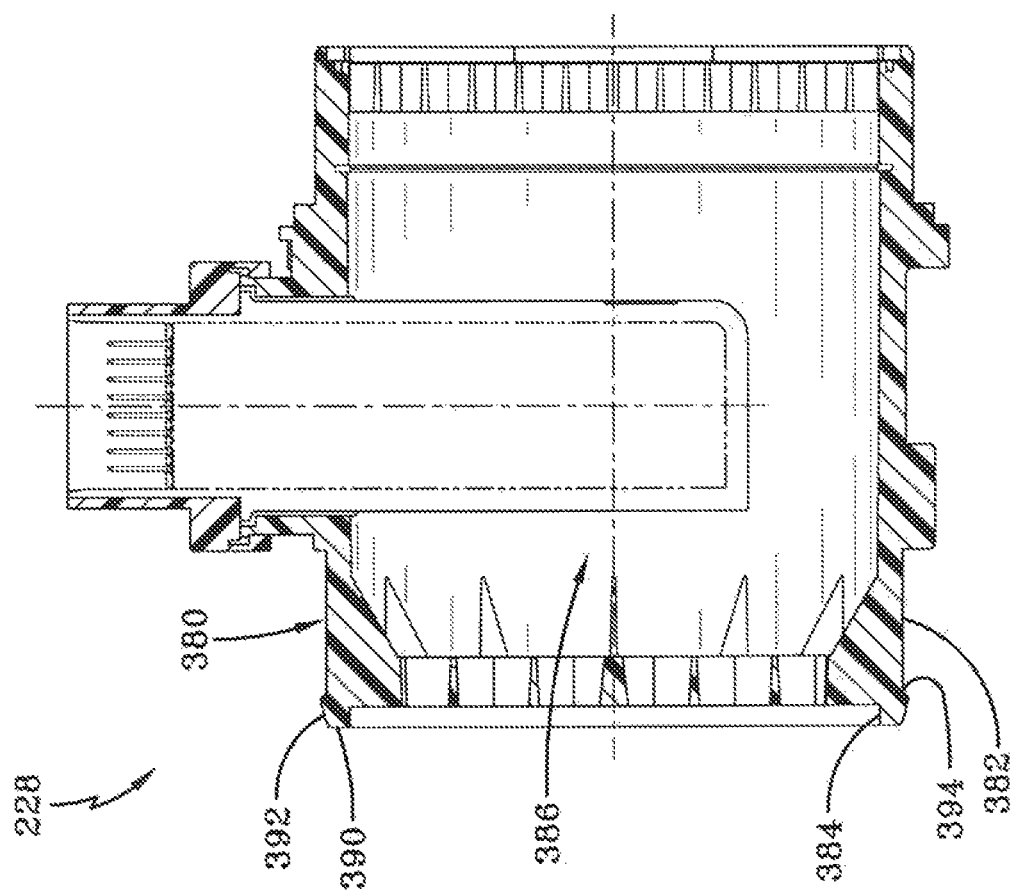
FIG. 35 is a cross-sectional view of the receiving port used in the alternative assembly according to the concepts of the present invention.

In a similar manner, a plurality of cuff struts 354 extend from the internal surface 342. In the present embodiment, four cuff struts are employed and are positioned opposite the port struts so as to be paired with one another. However, it will be appreciated that this positional pairing is not required, nor is it required that the number of cuff struts match the number of port struts. Additionally, the number of struts may be a single strut or may be any number as deemed appropriate. The port strut 345 may be paired with a cuff strut 354 as deemed appropriate. And, where there are multiple pairs of struts, they are spaced apart from one another. Indeed, as best seen in FIG. 31, the struts may be spaced or equidistantly spaced apart from one another. Each cuff strut 354 may include a cuff ramp 356 which may extend angularly inwardly from the cuff edge 338. Extending from each cuff ramp 356 is a cuff strut surface 358 which may be substantially concentric with the internal surface 342. Each cuff strut surface 358 may extend to a cuff catch 360 which is connected to the internal surface 342. Both the cuff ramp 356 and the cuff catch 360 may be angularly inclined. In a construction similar to the port strut, the cuff strut may provide the cuff ramp 356 at an angle less than 90° with respect to the external surface 334 and the cuff catch 360 may be substantially perpendicular to the internal surface 342. In some embodiments, the port ramp 346 and the cuff ramp 356 may have an angle with respect to the external surface of between 20° to 60°. And in some embodiments the angle of the ramp may be about 45°. The ramp angles are selected to facilitate the axial installation of the clip on to the receiving port. Each of the cuff struts 354 and the port struts 345 may be provided with strut ends 361 which may be tapered at an angle between the internal surface and the respective port strut surfaces 348 or the respective cuff strut surfaces 358. The tapered strut ends 361 may facilitate radial removal of the clip from the cuff provided there is no cuff finger 316. It will also be appreciated that the edge grooves 340 may be positioned on the external surface 334 substantially opposite a corresponding port strut 345 or cuff strut 354.

Disposed between each of the struts 345 and 354 a clip compression surface 362 may be formed. In particular, the area between the port catch 350 and the cuff catch 360 may be of a diameter slightly smaller than the outer diameter of the cuff which may apply a compressive force to the cuff when it is installed onto the receiving port. The clip may also be provided with edge notches 366 which are along the respective cuff edge and port edge and positioned between the respective struts along each edge. In some embodiments a finger hole 368 may be provided that is diametrically opposite the gap 344. In selected embodiments the finger hole 368 will receive the finger, 316 that extends from the cuff body 250.

Referring now to FIGS. 34-38, it can be seen that the receiving port is designated generally by the numeral 228. The receiving port 228 includes a tubular duct 380 which is sized to fit within the cuff wherein the outer diameter of the duct 380 is typically equivalent to the inner diameter of the cuff or slightly larger. In any event, the duct 380 includes an exterior surface 382 opposite an interior surface 384. The duct 380 defines an opening 386, which may have a screen and which is contiguous with the body opening 238 and the opening formed by the attached cuff when the components are assembled to one another. An end surface 390 connects the exterior surface 382 to the interior surface 384. An entry ramp 392, which may be at the end surface 390 or somewhat displaced from the end surface, extends outwardly from the exterior surface 382. The entry ramp 392 terminates at a catch surface 394 which extends from a top of the entry ramp to the exterior surface 382. Somewhat removed from the entry ramp 392 may be an annular ridge 400 which extends radially outward from the exterior surface 382. The annular ridge 400 includes a front wall 402 that extends substantially perpendicularly from the exterior surface. A ridge surface 404 extends from the front wall 402 to a ridge wall 406 which extends substantially perpendicularly back to the exterior surface 382. In some embodiments, the annular ridge 400 may extend so as to form an alignment protrusion 408. The alignment protrusion may be used for alignment with other structural features provided by the cuff and/or the retaining clip.

As mentioned previously, the sub-assembly 320 comprises the tubular body 222 to which is molded thereon or otherwise secured the cuff 224. In some embodiments the retaining clip 230 is pre-assembled to the sub-assembly 320 prior to insertion on to the receiving port 228. In other embodiments, the sub-assembly 220 is assembled on to the receiving port 228 and then the retaining clip is used to interconnect those two components to one another. It will be appreciated that if the finger 316 is provided on the cuff, then the clip cannot be rotated so as to attach or detach the clip to the cuff and receiving port. In any event, the cuff struts 354 and port struts 345 are configured so as to be received in the corresponding retention groove 226 and in particular the strut pockets 280 provided by the cuff.

Figure 36:
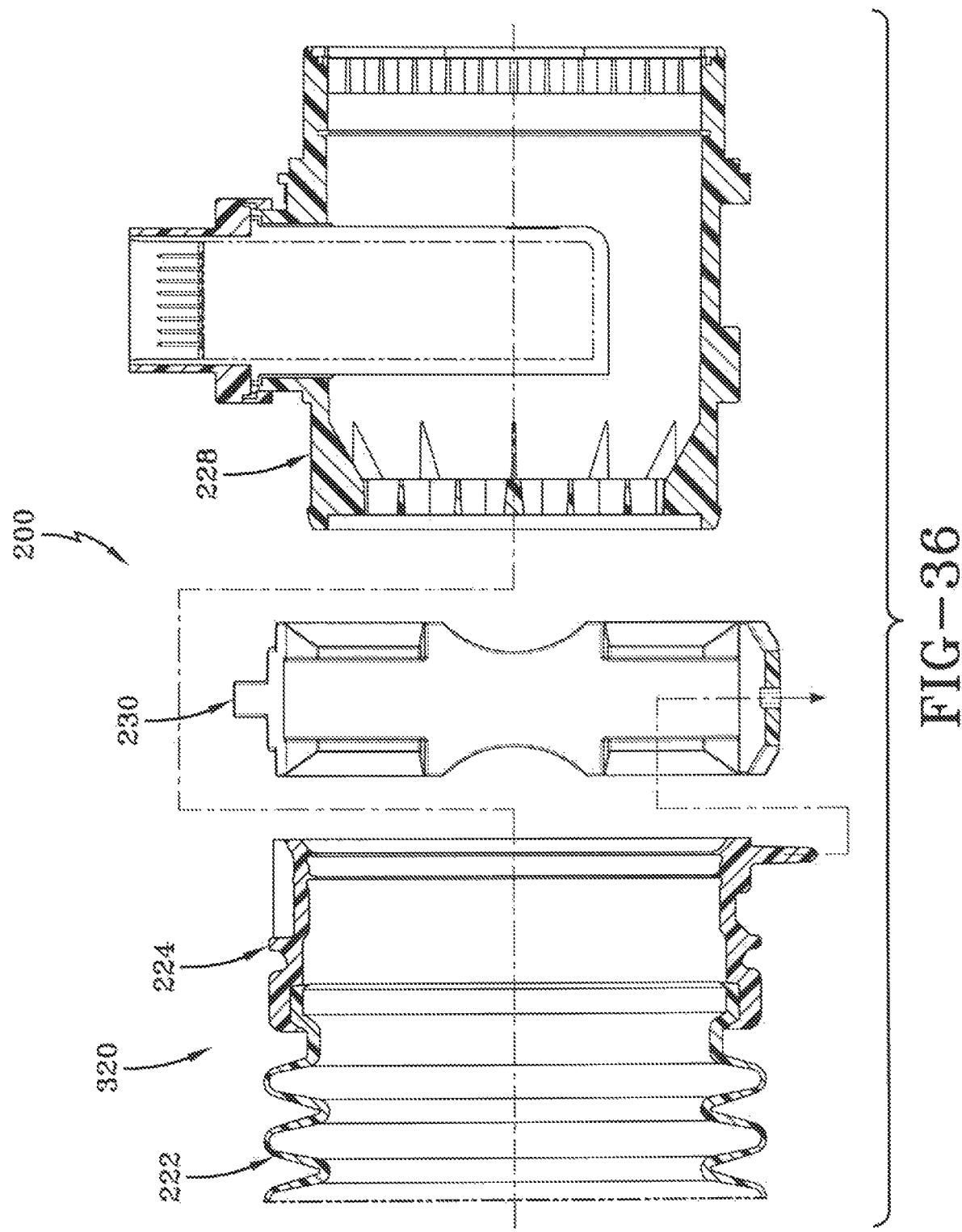
FIG. 36 is an exploded view of the alternative assembly according to the concepts of the present invention.
Figure 37:
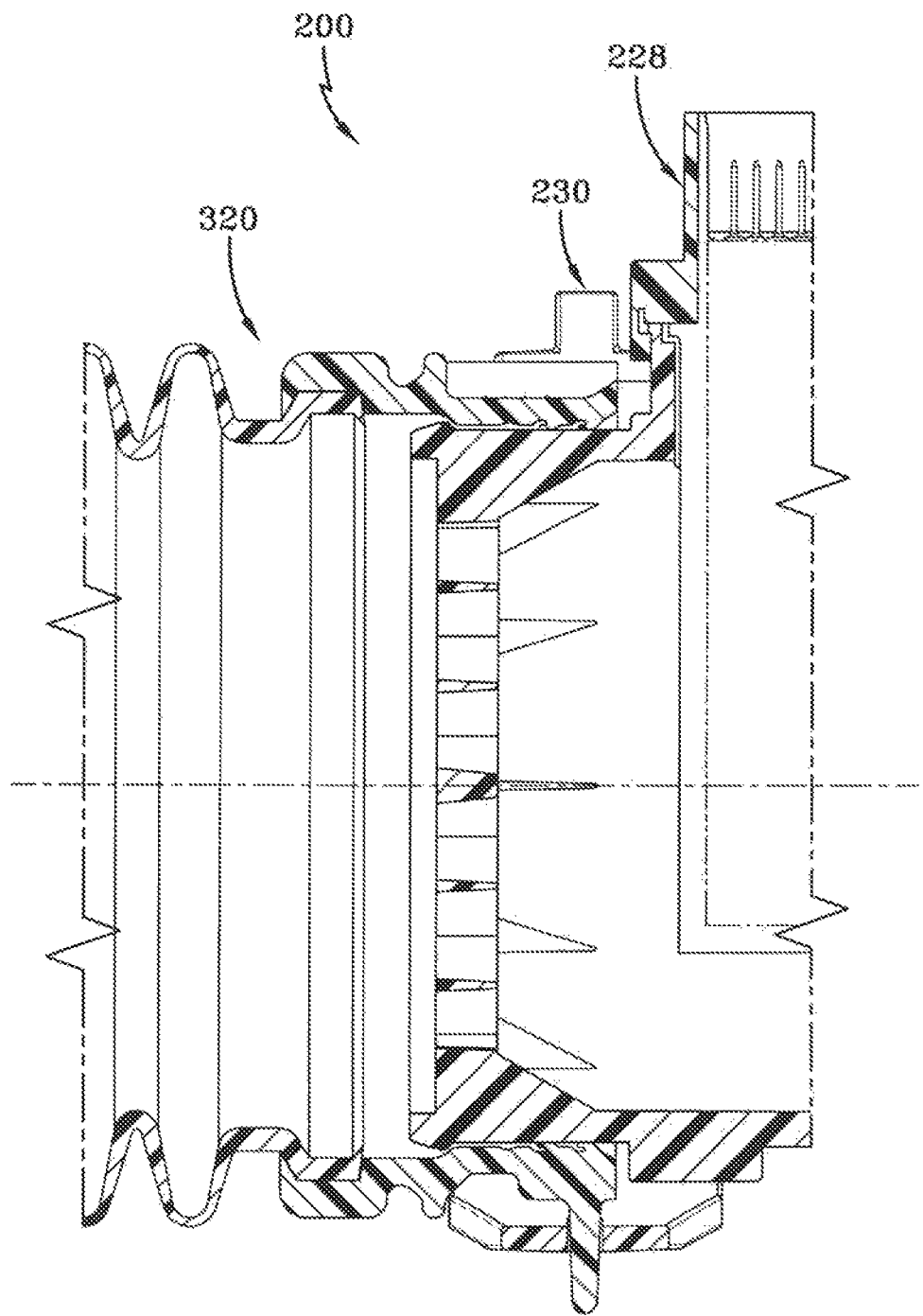
FIG. 37 is a cross-sectional view of the assembled alternative assembly according to the concepts of the present invention.
Figure 38:
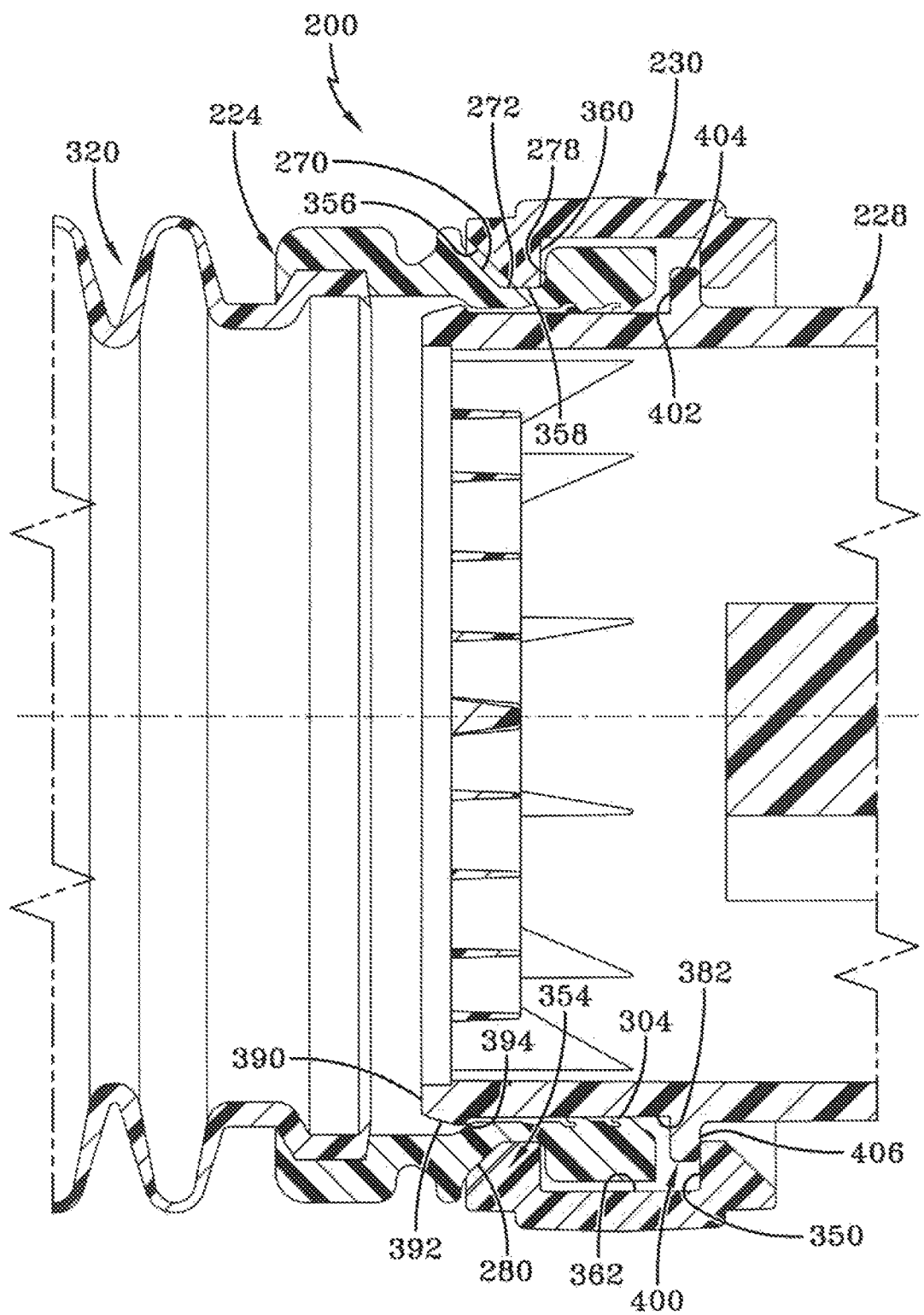
FIG. 38 is another cross-sectional view of the assembled alternative assembly according to the concepts of the present invention.

Referring now to FIGS. 36-38, it can be seen how the various components are assembled to one another. In one embodiment, the retaining clip 230 is pre-assembled onto the sub-assembly whereupon insertion of the sub-assembly onto the receiving port initially causes the retaining clip to temporarily deflect until such time that portions of the clip may latch on to the receiving port and secure the cuff and connected tubular body to the port. In particular, the port ramps 346 (or cuff ramps if the clip is reversed) are engaged by the front wall 402 of the ridge 400. After the strut surface 348 clears the ridge 402, the port struts are no longer deflected and the port catch 350 is positioned adjacent and/or in contact with the ridge wall 406. In another embodiment the retaining clip 230 may be separately attached after the cuff has been inserted onto the receiving port. This is done by spreading the ends 343 of the clip apart and then letting the ends collapse around the assembled cuff and the port. In either scenario, the clip functions to retain the sub-assembly onto the receiving port. When it is desired to remove the sub-assembly from the receiving port, the clip may be removed by spreading apart the ends 343 of the clip at the lateral orientation gap and then axially withdrawing the sub-assembly or by radially rotating the clip. The clip can only be rotated if the finger 316 is not provided by the cuff. In this scenario, the tab 332 is rotated in either direction and the tapered strut ends 361 are deflected in their direction of rotation by the adjacent groove steps 274 of the strut pocket 280. The deflection partially expands the clip whereupon it can be radially removed.

As best seen in FIG. 38, the cuff struts 354 are received in the corresponding strut pockets 280. Additionally, the inward groove ramp 270 is aligned so as to match the angular cuff ramp 356. Additionally, the cuff strut surface 358 is disposed onto the groove surface 272 while the cuff catch surface 360 is aligned with and in most embodiments adjacent to and engaged by the groove sidewall 278 as best seen in FIGS. 37 and 38. While the cuff struts engage and capture the cuff, the port struts function to engage and capture the port. With the cuff fully received on the port, the port catch 350 engages and is in touching contact with the ridge wall 406. Additionally, the retention ramp 309 is aligned and adjacent to the catch 394 associated with the port's entry ramp 392. In at least some areas the clip compression surface 362 exerts a compressive sealing force on the sealing section 264 and in particular on the sealing ribs 288, the sealing lip 292 and the transverse ribs 294. These components transfer the sealing forces to the sealing surface 296 and at least some portions of the retention surface 298. As a result, a compressive seal is formed between the cuff body interior surface 254, and in particular the radial wipers 304 of the sealing surface 296, and the exterior surface 382 of the duct 380.

In addition to exerting a sufficient compressive sealing force between the interior of the cuff 224 and the exterior of the port, the retaining clip 230 also functions to isolate the sealing surface 296 and the retention section 298 from torsional, vibration and other stress forces exerted by the tubular body 222 and/or the receiving port 228. As best seen in FIGS. 37 and 38, the struts 345 and 354 are axially displaced on corresponding sides of the interface between the sealing surface 296 and the exterior surface 382 of the receiving port 228. As such, any forces applied to the tubular body 222 are transmitted into the cuff body 250. A majority of these forces are then encountered by the cuff struts and transferred through the remainder of the clip body 330 to the receiving port which tends to be of a relatively more rigid construction. In other words, the clip 230 provides an effective strain relief around the sealing area between the cuff and the port. As a result, the predominant gripping forces are exerted by the struts on either side of the seal between the fins 304 provided by the cuff and the external ribs provided by the cuff. The gripping and/or compressive sealing force exerted by the retaining clip on the cuff and the receiving port may be adjusted by any number of factors, such as, but not limited to, the materials selected, the overall diameter of the port and cuff, the thickness of the clip, the sizing of the notches 366 and/or the edge grooves 340, and the depth of the struts.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A clean air duct and retaining clip assembly for installation on a receiving port, comprising:
   a tubular body made from a polymeric material;
   a cuff extending from said tubular body, said cuff made from a flexible polymeric material relatively softer than the polymeric material used for said tubular body,
   said cuff comprising:
      a cuff body exterior surface comprising a collar, a retention groove, and a sealing section; and
      a cuff body interior surface opposite said cuff body exterior surface having a sealing surface which is substantially opposite said sealing section and a retention surface substantially opposite said retention groove,
   said cuff having said collar connected to said tubular body, said retention groove extending axially away from said collar, and said sealing section extending axially away from said retention groove, wherein said retention groove is positioned axially between said collar and said sealing section and wherein said retention groove includes at least one strut pocket; and
   a retaining clip received around said cuff, said retaining clip having at least one inwardly extending cuff strut received in a corresponding strut pocket and at least one inwardly extending port strut so as to hold said cuff on the receiving port and wherein said sealing section, which is also received on the receiving port, is positioned between said at least one inwardly extending cuff strut and said at least one inwardly extending port strut and is isolated from forces applied to said tubular body.

2. The assembly according to claim 1, wherein said sealing section includes a sealing rib adjacent to said retention groove, and wherein said retaining clip applies a compressive force to said sealing rib.

3. The assembly according to claim 1, wherein said sealing surface includes at least one inwardly extending radial wiper.

4. The assembly according to claim 1, wherein said retaining clip has opposed ends with a gap therebetween, said cuff having a pair of lateral ribs extending from said retention groove to a rim end which is laterally opposite said collar, said lateral ribs disposed between said gap when said retaining clip is received around said cuff.

5. The assembly according to claim 4, wherein said retaining clip comprises:
an external surface;
an internal surface opposite said external surface, said at least one cuff strut extending from said internal surface; and
opposed edges connecting said external surface to said internal surface, said opposed edges having edge notches.

6. The assembly according to claim 5, wherein said at least one inwardly extending cuff strut extends from one of said edges and said at least one inwardly extending port strut extends from said opposite edge.

7. The assembly according to claim 1, wherein said cuff has a cuff body with a cuff body interior surface with an integral sealing surface which is received on and adjacent the receiving port and positioned between said at least one inwardly extending cuff strut and said at least one inwardly extending port strut.

8. The assembly according to claim 1, wherein said retaining clip has opposed ends with a gap therebetween.

9. A retaining clip used to connect a clean air duct to a receiving port, comprising:
an arcuate clip body having an external surface opposite an internal surface connected by opposed edges, said clip body having end surfaces that face one another to form a gap therebetween; and
at least one pair of struts extending inwardly from said internal surface, wherein one of said struts is proximal one of said edges and the other of said struts is proximal the opposite edge, wherein each said strut has a ramp extending inwardly from said opposed edge, a strut surface extending from said ramp, and a catch extending substantially perpendicularly between said strut surface and said internal surface.

10. The retaining clip assembly according to claim 9, wherein said strut surfaces are concentric with said external surface.

11. The retaining clip assembly according to claim 9, wherein said ramp is at an angle less than 90° with respect to said external surface.

12. The retaining clip assembly according to claim 9, wherein said strut surfaces are concentric with said external surface, said ramp is at an angle less than 90° with respect to said external surface, and wherein said catch is substantially perpendicular to said internal surface.

13. The retaining clip assembly according to claim 9, wherein each said strut has opposed strut ends connected to said catch, said ramp and said strut surface.

14. The retaining clip according to claim 13, wherein said strut ends are tapered.

15. The retaining clip according to claim 9, wherein multiple pairs of struts are spaced apart from one another on said internal surface.

16. The retaining clip according to claim 15, further comprising:
edge notches, wherein said edge notches are positioned between said respective struts.

17. The retaining clip according to claim 15, further comprising:
edge grooves positioned on said external surface substantially opposite said strut extending from said internal surface.

18. The retaining clip according to claim 9, wherein said end surfaces connect said opposed edges to one another.

19. The retaining clip according to claim 18, further comprising:
a tab radially extending from said external surface.

20. A clean air duct and retaining clip assembly for installation on a receiving port, the assembly comprising:
a tubular body having a cuff end, said tubular body made from a polymeric material;
a cuff extending from said tubular body, said cuff made from a flexible polymeric material relatively softer than the polymeric material used for said tubular body, said cuff having a cuff groove, wherein said cuff has an interior surface which comprises a radially inward wiper axially aligned with said cuff groove, and wherein only said cuff is receivable on the receiving port so that there is axial separation between said cuff end of said tubular body and the receiving port; and
a retaining clip only partially received in said cuff groove so as to allow repeatable attachment and detachment of only said cuff on the receiving port, said retaining clip comprising a clip body having a cuff wall and a retention wall with a rim groove formed therebetween, wherein a secure seal between said cuff and the receiving port is formed between said cuff wall and said retention wall within said rim groove.

21. The assembly according to claim 20, wherein said cuff extends radially and axially from said tubular body, said cuff having a cuff body secured to said tubular body and a rim at an end of said cuff opposite said tubular body, said cuff having an interior surface substantially shaped to conform to the receiving port.

22. The assembly according to claim 20, wherein said cuff includes a chamfer and the receiving port includes a chamfer ramp, wherein said chamfer is captured adjacent said chamfer ramp by said retaining clip so as to form said secure seal.

23. A clean air duct and retaining clip assembly for installation on a receiving port, comprising:
a tubular body;
a cuff extending from said tubular body, said cuff having a cuff body exterior surface comprising a collar connected to said tubular body, a retention groove adjacent said collar and a sealing section adjacent said retention groove, wherein said retention groove includes at least one strut pocket, and wherein said sealing section includes a sealing rib adjacent to said retention groove, said cuff having a cuff body interior surface with an integral sealing surface wherein said cuff body interior surface is opposite said cuff body exterior surface having said integral sealing surface which is substantially opposite said sealing section and a retention surface substantially opposite said retention groove; and a retaining clip received around said cuff, said retaining clip having at least one inwardly extending cuff strut received in a corresponding strut pocket so as to hold said cuff on the receiving port and isolate said integral sealing surface, which is also received on and adjacent the receiving port, from forces applied to said tubular body.

24. The assembly according to claim 23, wherein said integral sealing surface includes at least one inwardly extending radial wiper.

25. The assembly according to claim 23, wherein said tubular body is made from a polymeric material, and wherein said cuff is made from a flexible polymeric material relatively softer than the polymeric material used for said tubular body.

26. The assembly according to claim 23, wherein said retaining clip has opposed ends with a gap therebetween.

* * * * *